United States Patent [19]
Wartenberg et al.

[11] Patent Number: 5,427,713
[45] Date of Patent: Jun. 27, 1995

[54] ENCAPSULATED LIQUID CRYSTAL STRUCTURES, APPARATUS CONTAINING THE SAME, AND METHODS THEREFOR

[75] Inventors: Mark F. Wartenberg, San Jose; Harriette Atkins, Mt. View; Robert H. Reamey, Palo Alto; Laurence Welsh, San Carlos; James Strain, Newark; Janusz Wójtowicz, Palo Alto; Wayne Montoya, Newark; Paul S. Drzaic, Palo Alto; John Havens, Menlo Park; Akira Tomita, Redwood City; Aldrich N. K. Lau, Palo Alto, all of Calif.

[73] Assignee: Raychem Corporation, Menlo Park, Calif.

[21] Appl. No.: 28,497

[22] Filed: Mar. 9, 1993

Related U.S. Application Data

[63] Continuation-in-part of Ser. No. 850,378, Mar. 10, 1992, abandoned.

[51] Int. Cl.⁶ .......................... C09K 19/54; G02F 1/13
[52] U.S. Cl. .......................... 252/299.5; 252/299.01; 359/51; 359/52
[58] Field of Search .................... 252/299.01, 299.5; 359/51, 52

[56] References Cited

U.S. PATENT DOCUMENTS

| | | | |
|---|---|---|---|
| 4,643,528 | 2/1987 | Bell, Jr. | 359/52 |
| 4,950,052 | 8/1990 | Fergason | 359/52 |
| 4,992,201 | 2/1991 | Pearlman | 252/299.1 |
| 5,056,898 | 10/1991 | Ma et al. | 359/94 |
| 5,116,528 | 5/1992 | Mullen et al. | 252/299.5 |
| 5,183,585 | 2/1993 | Koyama et al. | 252/299.01 |
| 5,202,063 | 4/1993 | Andrews et al. | 264/4.6 |
| 5,206,747 | 4/1993 | Wiley et al. | 359/51 |
| 5,233,445 | 8/1993 | Kamath et al. | 359/51 |

FOREIGN PATENT DOCUMENTS

| | | |
|---|---|---|
| 0156615A3 | 10/1985 | European Pat. Off. |
| 0204537A2 | 12/1986 | European Pat. Off. |
| 0251629A1 | 1/1988 | European Pat. Off. |
| 0260455A1 | 3/1988 | European Pat. Off. |
| 0313053A2 | 4/1989 | European Pat. Off. |
| 0421240A2 | 4/1991 | European Pat. Off. |
| 0475117A2 | 3/1992 | European Pat. Off. |
| 0507204A1 | 10/1992 | European Pat. Off. |
| 0509534A2 | 10/1992 | European Pat. Off. |
| 3-288823 | 12/1991 | Japan |
| 4-7518 | 1/1992 | Japan |
| 4-240614 | 8/1992 | Japan |
| WO90/03593 | 4/1990 | WIPO |
| WO91/01511 | 2/1991 | WIPO |

OTHER PUBLICATIONS

Schadt et al., J. Chem. Phys. vol. 65, No. 6, pp. 2224-2230 (1976).
Koval'chuk et al., Mol. Cryst. Liq. Cryst. vol. 193, pp. 217-221 (1990).
Nomura et al., Jap. J. Applied Phys., vol. 30, No. 2, pp. 327-330 (Feb. 1991).
Adomenas et al., Mol. Cryst. Liq. Cryst. vol. 215, pp. 153-160 (1992).

*Primary Examiner*—Shean Wu
*Attorney, Agent, or Firm*—Herbert G. Burkard; Yuan Chao

[57] ABSTRACT

A liquid crystal display is made from an encapsulated liquid crystal structure comprising a liquid crystal composition dispersed in a containment medium. Selected additives may be added to the encapsulated liquid crystal structure to improve performance characteristics such as the operating field, the hysteresis, and the voltage holding ratio.

32 Claims, 10 Drawing Sheets

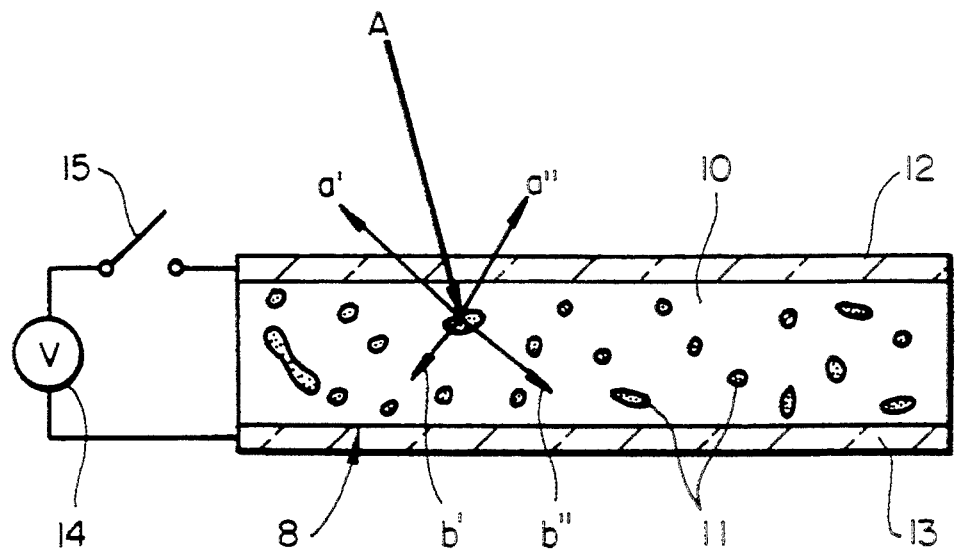
FIG_1
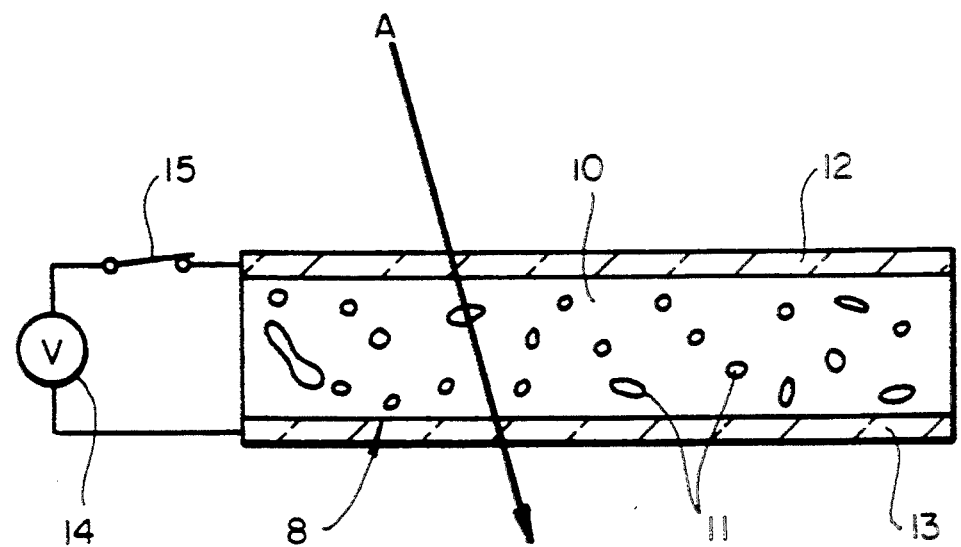
FIG_2

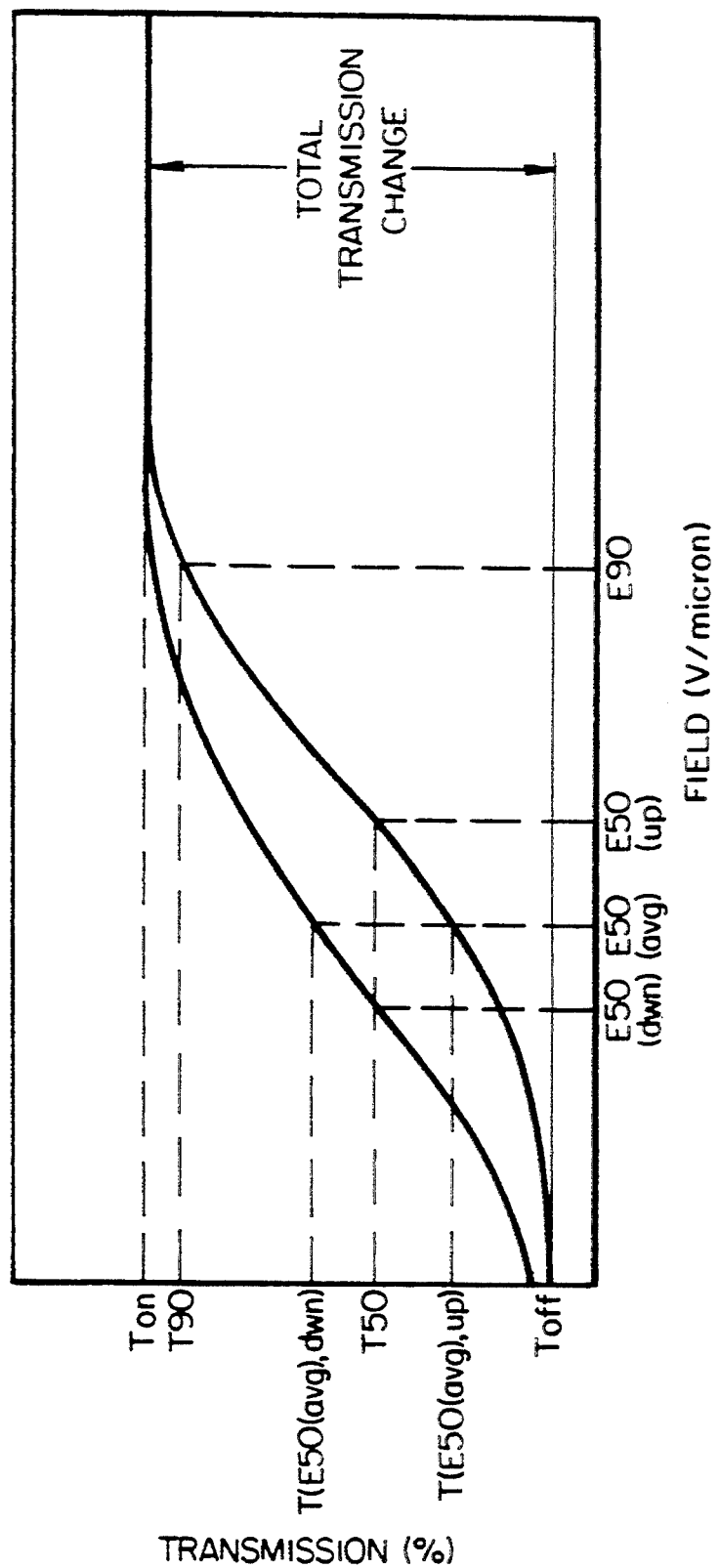
FIG_3

ENCAPSULATED LIQUID CRYSTAL STRUCTURES, APPARATUS CONTAINING THE SAME, AND METHODS THEREFOR

This application is a continuation-in-part of application Ser. No. 07/850,378 now abandoned, filed Mar. 10, 1992, the disclosure of which is incorporated herein by reference.

TECHNICAL FIELD OF THE INVENTION

This invention relates to liquid crystal structures, display devices containing the same, and methods therefor.

BACKGROUND OF THE INVENTION

Liquid crystal displays ("LCD's"), in which the electro-optically active element comprises liquid crystalline material, are well known in the art.

One type of LCD employs an encapsulated liquid crystal structure in which a liquid crystal composition is encapsulated or dispersed in a containment medium such as a polymer. When a voltage corresponding to a sufficiently strong electric field is applied across the encapsulated liquid crystal structure (the "field-on" condition), the alignment of the liquid crystal molecules therein is re-oriented in accordance with the field, so that incident light is transmitted. Conversely, in the absence of such a voltage (the "field-off" condition) the alignment of the liquid crystal molecules is random and/or influenced by the liquid crystal-matrix interface, so that the structure scatters and/or absorbs incident light. The applied voltage at which the structure changes from its field-off condition to its field-on condition is generally referred to as the operating voltage.

Choice of the containment medium and liquid crystal material can affect LCD performance in aspects such as threshold voltage, switching speed, and hysteresis. Some of the effects are bulk effects, while others arise from interactions at the containment medium-liquid crystal composition interface.

An important performance parameter is the operating voltage at which the display switches from one visual state to the other. A lower voltage means lower power requirements, making the display attractive for battery-powered devices. Other important performance parameters are switching speed and hysteresis. We have discovered additives and other improvements which markedly reduce the operating field, the switching speed, and/or the hysteresis in a display comprising encapsulated liquid crystal structures.

SUMMARY OF THE INVENTION

In one embodiment, this invention provides a liquid crystal device having a reduced operating field $E_{90}$, comprising
  a first electrode;
  a second electrode, at least one of the first and second electrodes being transparent; and
  an encapsulated liquid crystal structure between the electrodes, comprising (a) a containment medium; (b) a liquid crystal composition dispersed in the containment medium; and (c) additive means which reduces the operating field $E_{90}$ of the device by at least 10%; wherein at least one of the following conditions is fulfilled:
  (i) liquid crystal composition is substantially free of dye and $$\frac{CR}{V_{90} \cdot (f/\#)^2} \geq 0.11$$

where CR is the contrast ratio of the liquid crystal device, $V_{90}$ is the operating voltage of the liquid crystal device, and f/# is the f/number of the measurement optics used to determine the contrast ratio, the optics operating at a wavelength between 400 and 700 nm and f/# having a value between 3.5 and 15;
  (ii) the voltage holding ratio of the liquid crystal device is at least 50%;
  (iii) the encapsulated liquid crystal structure further comprises a pleochroic dye dissolved in the liquid crystal material and the fraction $$\frac{(T_{on})^2}{T_{off} \cdot V_{90}}$$

is at least 10% greater than for an otherwise identical reference device in which the additive means is absent, wherein $T_{on}$ is the maximum transmission of the liquid crystal device in the presence of an applied sufficient voltage, $T_{off}$ is the transmission of the liquid crystal device in the absence of any applied voltage, and $V_{90}$ is the operating voltage of the liquid crystal device;
  (iv) the liquid crystal device has a clearing point no more than 20° C. less than that of an otherwise identical reference liquid crystal device in which the additive means is absent;

(v) $\dfrac{E_{max} - E_{min}}{E_{avg}} < 0.30$ where $E_{avg}$, $E_{max}$, and $E_{min}$ are the average, maximum, and minimum values, respectively, of the operating field $E_{90}$ in the 10°–55° C. temperature range;
  (vi) the contact angle between the liquid crystal composition and the containment medium is more than 5° greater than the contact angle between an otherwise identical liquid crystal composition and containment medium in which the additive means is absent;
  (vii) the hysteresis of the liquid crystal device is at least 20% less than the hysteresis of an otherwise identical reference liquid crystal device in which the additive means is absent;
  (viii) the additive means is a non-ionic surface active agent having sufficient activity to lower the surface tension of water by more than 10 dyne/cm when used in an amount of less than 2% w/w;
  (ix) a film of the encapsulated liquid crystal structure has a wide-angle X-ray diffraction spectrum in which the scattering between 14 and 30 degrees $2\theta$ is at least 20% less than that of an otherwise identical film of encapsulated liquid crystal structure in which the additive means is absent;
  (x) the additive means causes a larger decrease in the operating field $E_{90}$ as the volume median cavity diameter is decreased; or
  (xi) the additive means is a compound having a polar functionality selected from the group consisting of hydroxyl, carbonyl, carboxylic acid, ester, and nitro and further have at least one $C_5$–$C_{15}$ branched alkyl group having at least two methyl groups therein.

In a second embodiment, this invention provides a liquid crystal device comprising:

a first electrode;

a second electrode, at least one of the first and second electrodes being transparent; and an encapsulated liquid crystal structure between the electrodes, comprising (a) a containment medium and (b) a liquid crystal composition dispersed in the containment medium, the encapsulated liquid crystal structure having a homeotropic transition temperature $T_H$ which is less than 5° C. or the temperature at which the device is operated, whichever is greater.

In a third embodiment, this invention provides a liquid crystal device having a reduced operating field $E_{90}$, comprising a first electrode;

a second electrode, at least one of the first and second electrodes being transparent; and an encapsulated liquid crystal structure between the electrodes, comprising (a) a containment medium; (b) a liquid crystal composition dispersed in the containment medium; and (c) additive means which reduces the operating field $E_{90}$ of the device by at least 10%; the additive means being selected from the group consisting of:

(i) a diol of the structure

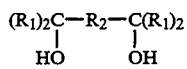  (I)

or diester thereof, where each $R_1$, which may be the same or different, is hydrogen or a $C_1$-$C_{18}$ alkyl or fluoroalkyl group and $R_2$ is a divalent moiety selected from the group consisting of

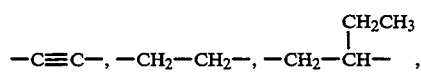

and $-C(CH_3)_2-$;

(ii) a phenolic compound of the structure

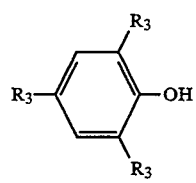  (II)

where each $R_3$, which may be the same or different, is hydroxyl or a $C_1$-$C_{18}$ alkyl or fluoroalkyl group;

(iii) a substituted benzylic alcohol of the structure

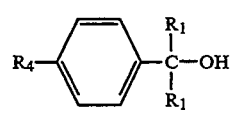  (III)

where each $R_1$, which may be the same or different, is as previously defined and $R_4$ is a $C_1$-$C_{18}$ alkyl, hydroxyalkyl, or fluoroalkyl group;

(iv) a cyanurate compound of the structure

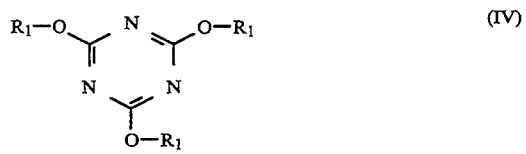  (IV)

where each $R_1$, which may be the same or different, is as previously defined;

(v) a $C_5$ to $C_{20}$ hydrocarbon or fluorinated alcohol (V);

(vi) a diketone of the structure:

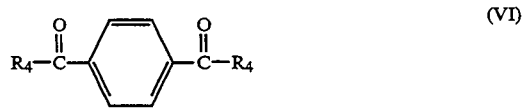  (VI)

where $R_4$ is as previously defined; and (vii) a $C_5$-$C_{20}$ carboxylic acid (VII).

In a fourth embodiment, this invention provides a method of making a film of an encapsulated liquid crystal structure comprising a liquid crystal composition dispersed in a containment medium, which method comprises the steps of (a) adding a reactive additive means to the liquid crystal composition;

(b) forming an emulsion of the liquid crystal composition, including the reactive additive, dispersed in the containment medium;

(c) coating the emulsion onto a support sheet and drying the emulsion to form a film of encapsulated liquid crystal structure supported by the support sheet; and (d) initiating the reaction of the reactive additive means to deposit the reacted additive means on the surfaces of the containment medium in contact with the liquid crystal composition.

BRIEF DESCRIPTION OF THE DRAWING(S)

FIGS. 1 and 2 show the operation of an encapsulated liquid crystal LCD.

FIG. 3 is an illustrative transmission v. applied field curve.

Figure 4A:
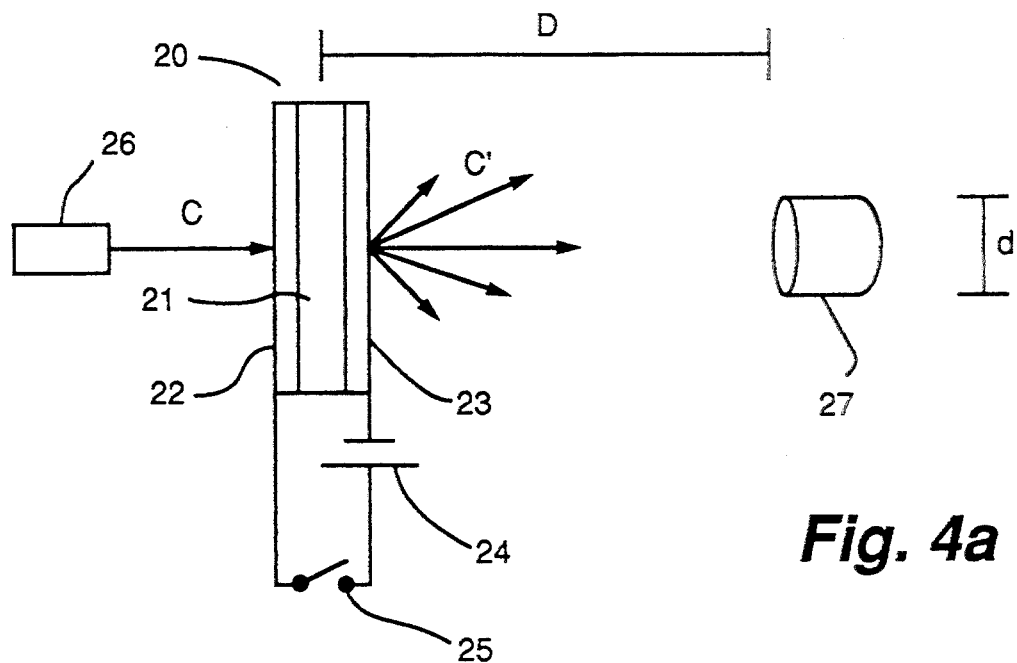
Figure 4B:
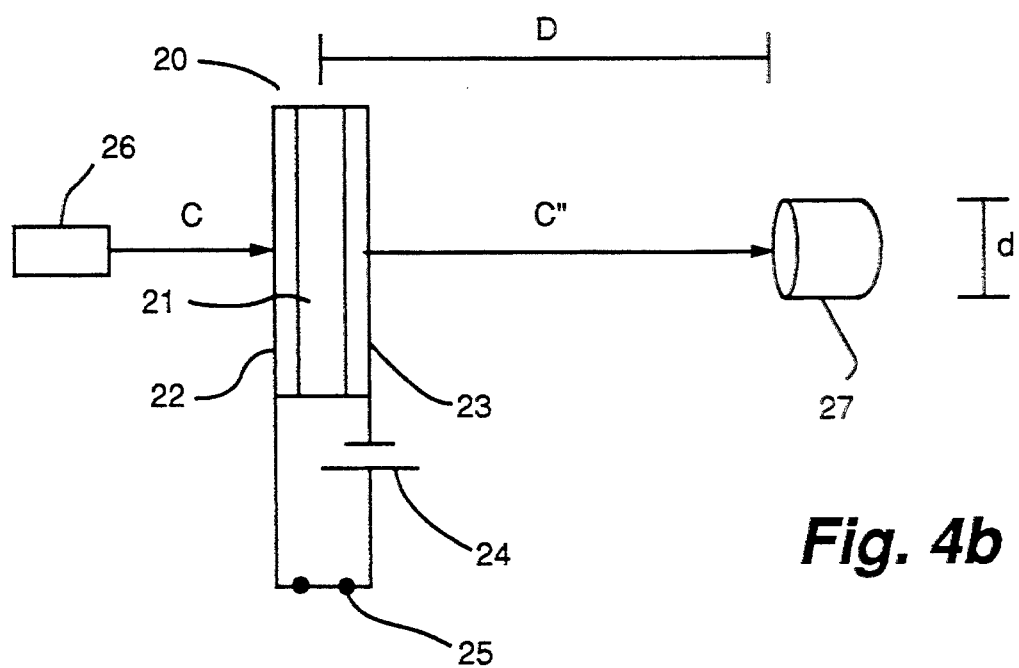

FIGS. 4a-b show a set-up for estimating the performance of a device wherein contrast between the off and on states is primarily attributable to forward light scattering.

Figure 5:
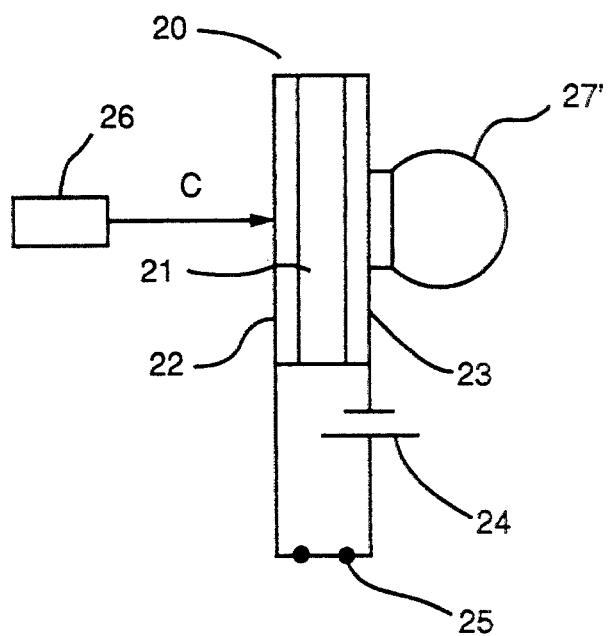

FIG. 5 shows a set-up for estimating the performance of a device wherein contrast between the off and on states is primarily attributable to absorption by a pleochroic dye.

Figure 6:
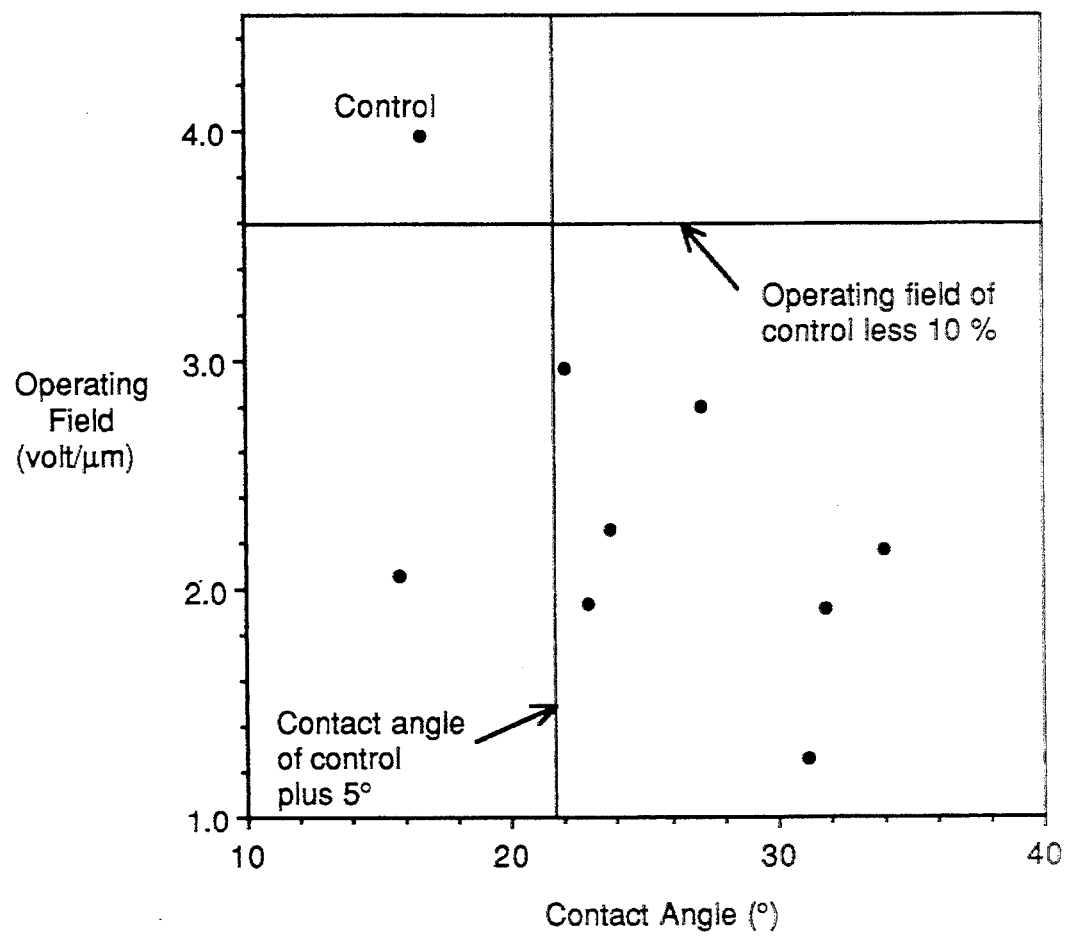
Figure 7:
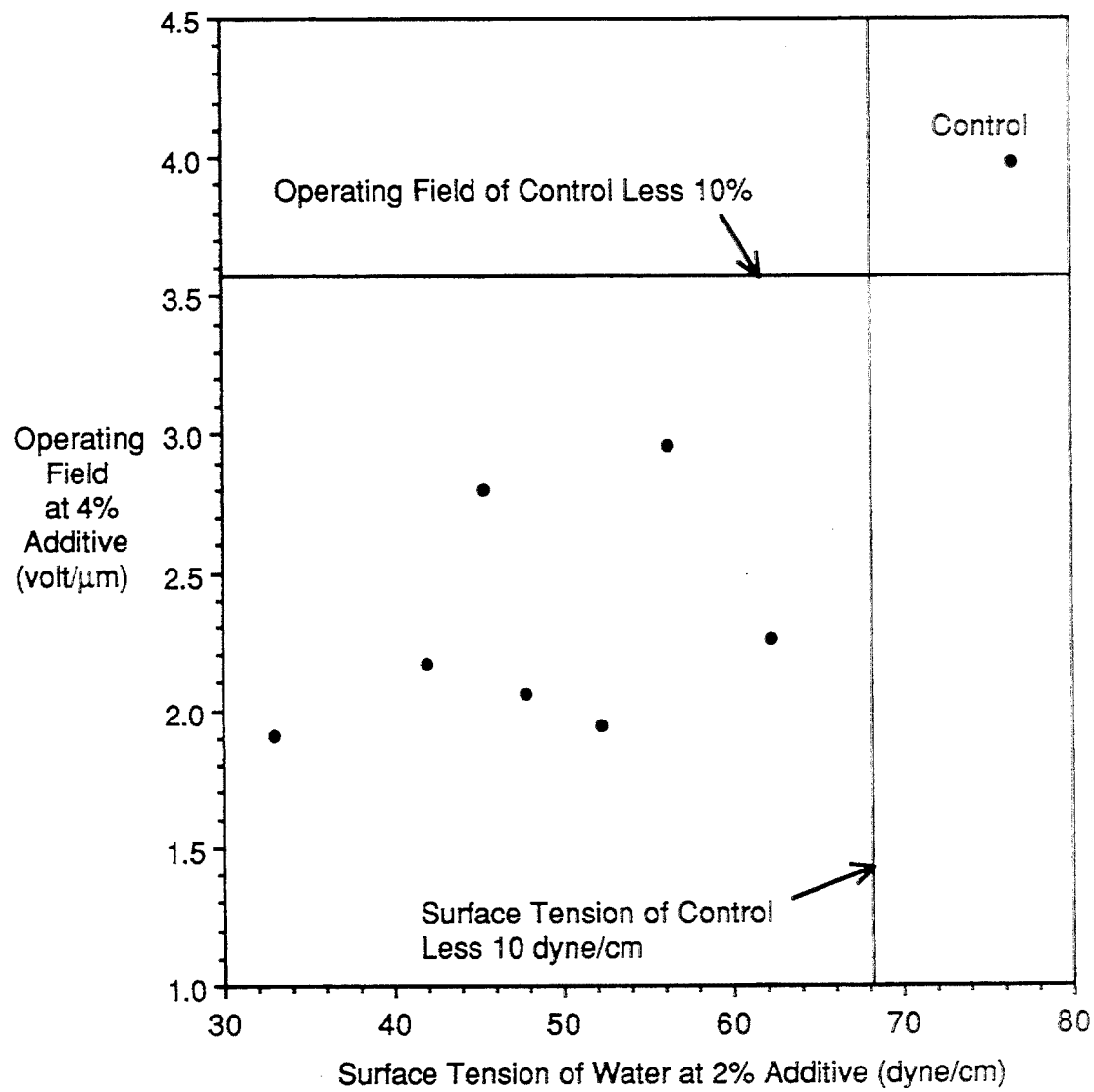

FIGS. 6 and 7 are plots of the operating voltage against contact angle and surface tension, respectively, for different devices.

Figure 8:
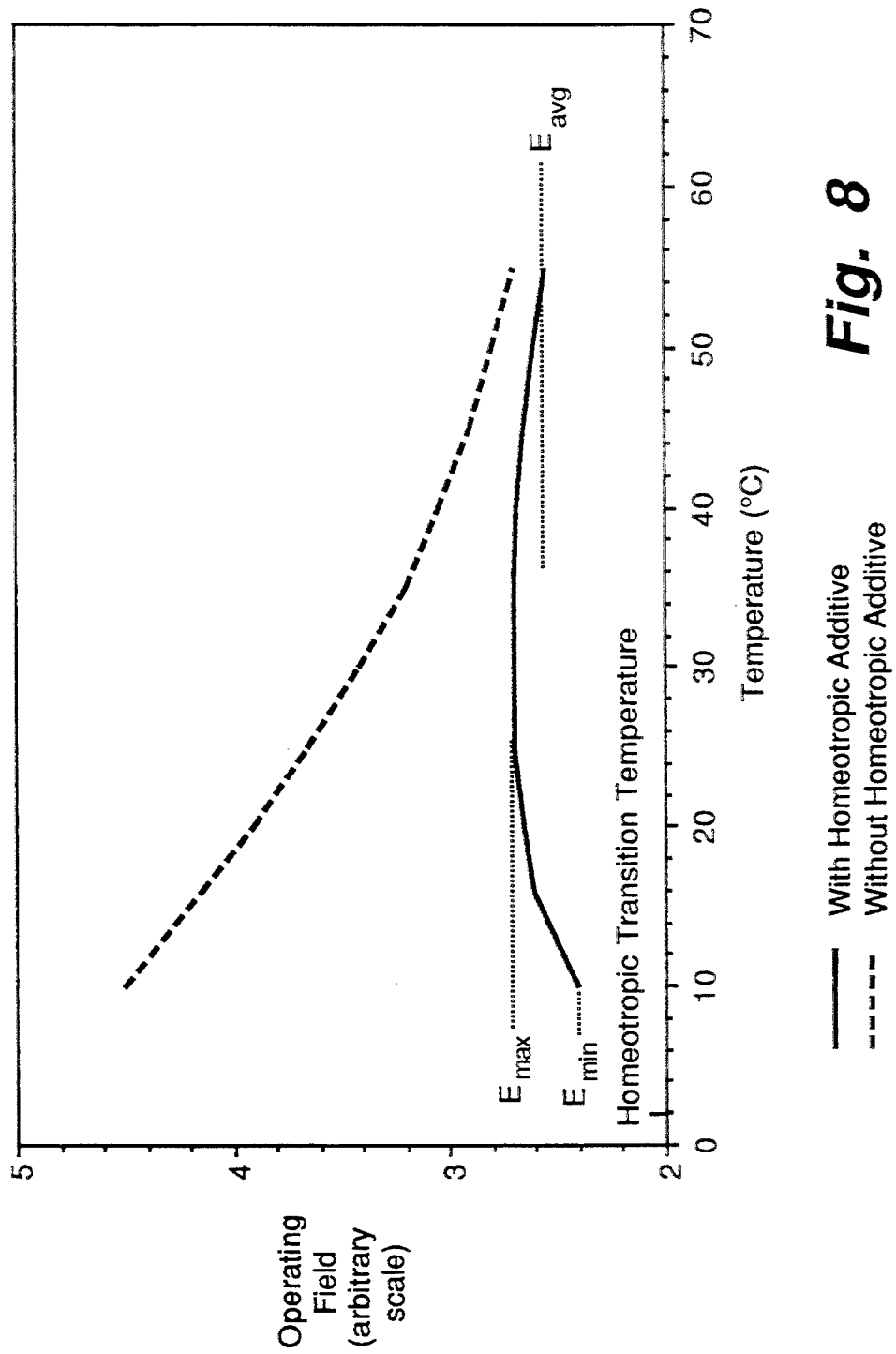

FIG. 8 illustrates the effect of the homeotropic additives on the operating field.

Figure 9A:
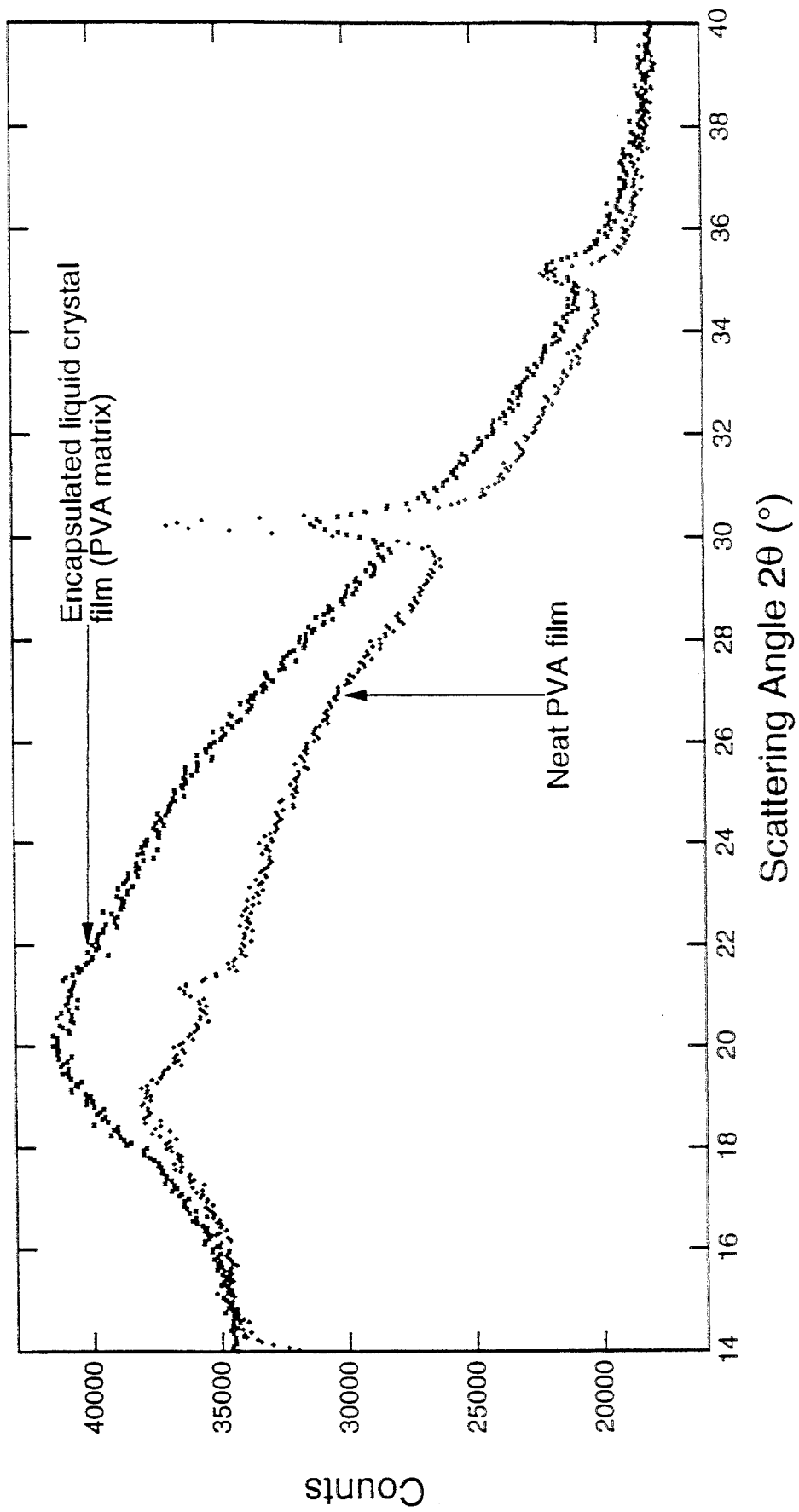
Figure 9B:
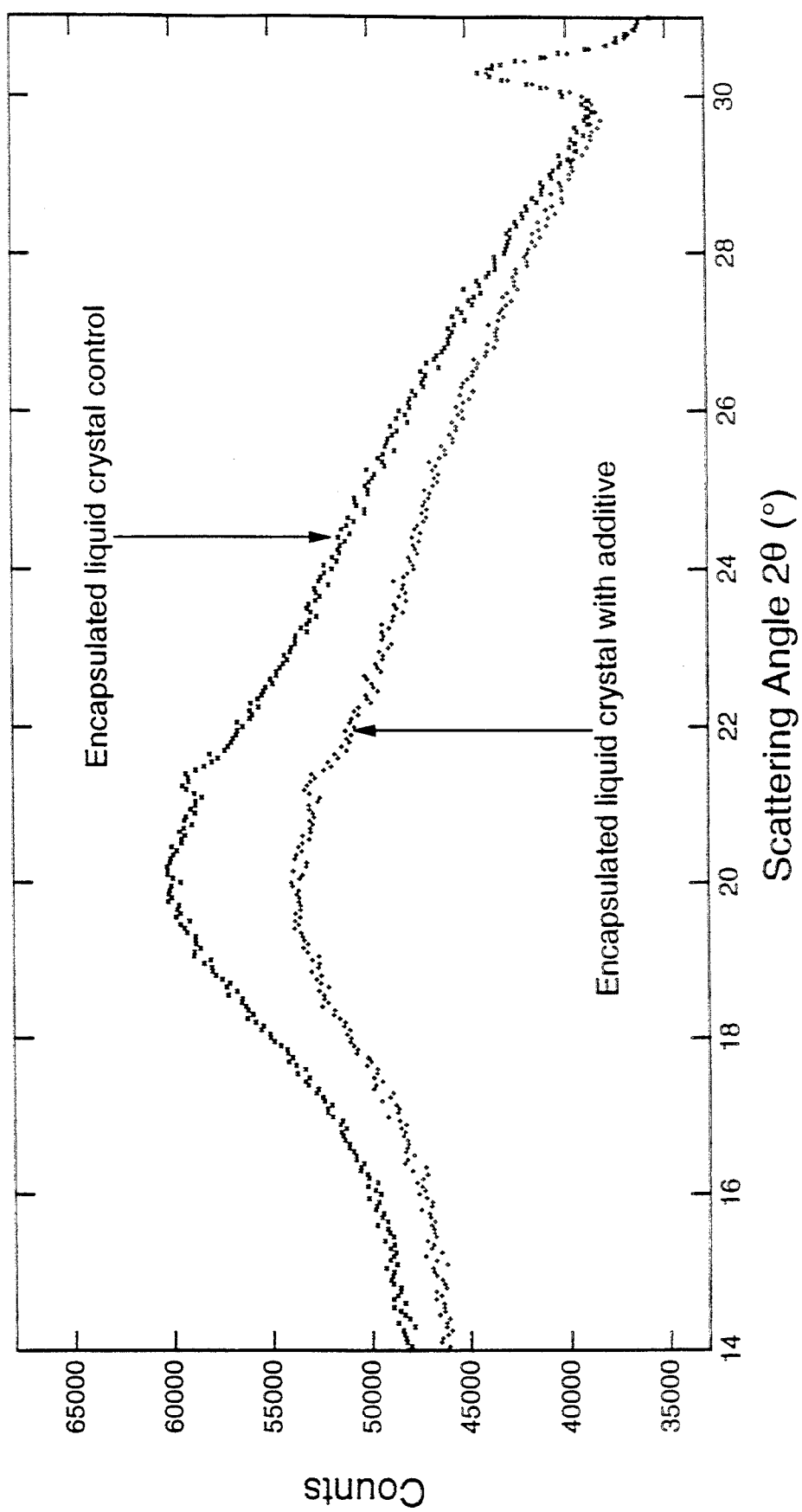

FIGS. 9a-b relate to the wide-angle X-ray diffraction spectra of films comprising encapsulated liquid crystal structures of this invention.

Figure 10:
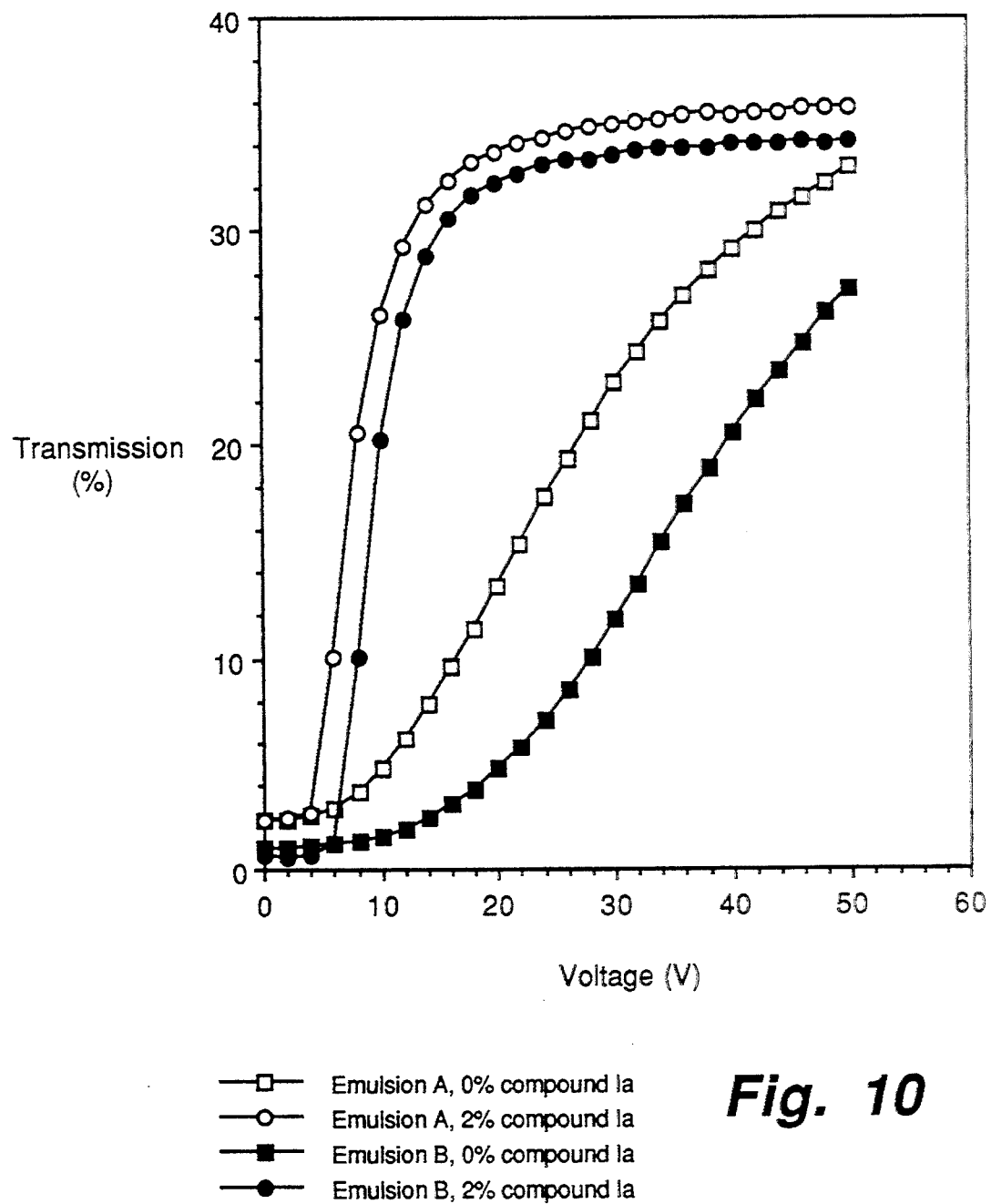

FIG. 10 shows voltage versus transmission plots for certain displays of the invention.

DESCRIPTION OF THE PREFERRED EMBODIMENTS

This detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

In an encapsulated liquid crystal structure, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal composition is nematic or operationally nematic. More preferably, it also has a positive dielectric anisotropy.

Individual liquid crystal molecules typically have elongated shapes, with a tendency to align themselves with their long molecular axes parallel to each other. This alignment causes a liquid crystal composition to be anisotropic, meaning that its measured physical, optical, and other properties are dependent on the direction of measurement (parallel or perpendicular to the direction of alignment). The alignment direction can be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

An anisotropic property is the dielectric constant ($\epsilon$), having two principal values, one perpendicular ($\epsilon_\perp$) to the long molecular axis and one parallel ($\epsilon_\parallel$) to the long molecular axis. An average dielectric constant ($\epsilon_{avg}$) can be calculated, which is conventionally a weighted average (See, e.g., Weber et al., Liq. Crystals, Vol. 5, No. 5, pp. 1381-1388 (1989)):

$$\epsilon_{avg} = \frac{2\epsilon_\perp + \epsilon_\parallel}{3}$$

Preferably, the liquid crystal composition should have an $\epsilon_{avg}$ greater than 5 (at 1 kHz and 25° C.). It is especially preferred that $\epsilon_{avg}$ is between about 5 and about 10, most preferably between about 6 and about 10. Dielectric constants and dielectric anisotropy may be measured by the method of Finkenzeller et al., "Physical Properties of Liquid Crystals: III. Dielectric Permittivities," The Merck Group Liquid Crystal Newsletter, No. 4 (March 1989).

In another aspect of the invention, the liquid crystal composition preferably has a low cyano content, i.e., less than 1.8 meq/g cyano groups (more preferably less than 0.5 meq/g). It is especially preferred that the liquid crystal composition be substantially free of cyano groups or consists essentially of compounds free of cyano groups. Preferred liquid crystal compositions for the practice of this invention are disclosed in Kamath et al., U.S. application Ser. No. 07/806,573, filed Dec. 12, 1991 now U.S. Pat. No. 5,233,445, the disclosure of which is incorporated herein by reference.

Commonly the liquid crystal composition generally does not consist of a single discrete compound, but is a mixture of different liquid crystal compounds. It is preferred that the liquid crystal composition comprises fluorinated and/or chlorinated liquid crystal compounds, such that the overall composition has a fluorine and/or chlorine content greater than 2.0 meq/g, preferably between 2.0 and 10.0 meq/g. It is especially preferred that the halogen is fluorine.

The liquid crystal composition also preferably has a large optical anisotropy $\Delta n$ (the difference between its ordinary and extraordinary refractive indices), also called the birefringence. A large $\Delta n$ leads to more scattering in the field-off state, resulting in a display with higher contrast. Since the ordinary refractive index of the liquid crystal composition generally is substantially matched to the refractive index of the containment medium, a larger $\Delta n$ also means a larger difference between the latter and the extraordinary refractive index of the liquid crystal material. This latter difference affects the field-off scattering, with larger amounts of scattering being associated with larger differences. Preferably, $\Delta n$ is greater than 0.15, more preferably between 0.20 and 0.30. Optical anisotropy may be measured by the method of Finkenzeller et al., "Physical Properties of Liquid Crystals: IV. Optical Anisotropy," The Merck Group Liquid Crystal Newsletter, No. 5 (October 1989).

The containment medium is preferably a polymeric material. Suitable containment media include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred containment medium.

Encapsulated liquid crystal structures of this invention may be formed by deposition from an emulsion containing both the containment medium and the liquid crystal composition, in the presence of a carrier medium. The emulsion may be made with apparatus such as propeller blade mixers, colloid mixers, and the like. The additive means may be added to either the containment medium or the liquid crystal composition, or both, and either before or after the emulsion is formed. Preferred emulsion techniques are taught in Fergason, U.S. Pat Nos. 4,435,047 (1984), 4,606,611 (1986), 4,616,903 (1986), and 4,707,080 (1987); Pearlman et al., U.S. Pat. No. 4,992,201 (1991); and Wartenberg et al., U.S. application Ser. No. 07/834,438, filed Feb. 12, 1992, now U.S. Pat. No. 5,202,063; the disclosures of which are incorporated herein by reference.

Encapsulated liquid crystal structures of this invention may also be made by phase separation techniques. In one embodiment, a solvent is evaporated from a homogeneous solution containing both containment medium and the liquid crystal composition. In another embodiment, an initially homogeneous mixture containing both containment medium and liquid crystal composition is heated to an elevated temperature, then cooled to phase-separate out liquid crystal volumes contained in the containment medium. Further, it may be formed by an in-situ polymerization process, in which a precursor of containment medium (e.g., a polymerizable monomer) is polymerized and simultaneously encapsulates a liquid crystal composition as it phase separates. The liquid crystal composition need not be entirely surrounded by the polymer, and may exist as part of a system with co-continuous phases. Preferred phase separation techniques are taught in Wu et al., U.S. Pat. No. 4,671,618 (1987); West et al., U.S. Pat. Nos. 4,673,255 (1987) and 4,685,771 (1987); Doane et al., U.S. Pat. No. 4,688,900 (1987); and Dainippon Ink and Chemicals, EP 0,313,053 (1989); the disclosures of which are incorporated herein by reference.

Typically, an encapsulated liquid crystal structure is substantially non-transparent in the absence of an electric field (the "field-off" state) and substantially transparent in the presence of a sufficient electric field (or "field-on" state). The electric field induces a change in the alignment of the liquid crystal molecules in the liquid crystal composition, in turn causing the encapsulated liquid crystal structure to switch from a highly light-scattering (and/or absorbent) state to a highly non-scattering (and/or non-absorbent) and substantially transparent state. Generally, it is preferred that the liquid crystal composition have a positive dielectric anisotropy and that the ordinary refractive index of the liquid crystal composition be matched with the refractive index of the containment medium, while the extraordinary refractive index is substantially mismatched therewith. There is further scattering which may occur due to the different liquid crystal alignments in neighboring droplets. If this is the dominant mode of scattering, the requirement for refractive index matching may be relaxed. The principles of operation of encapsulated liquid crystal structures are further described in the aforementioned references, particularly the Fergason patents. In those portions of the encapsulated liquid crystal structure to which a sufficient electric field is applied, the transition from a non-transparent state to a transparent state occurs, while adjacent areas to which no electric field has been applied remain non-transparent.

The principle of operation of an encapsulated liquid crystal structure is illustrated in FIGS. 1 and 2 (like numerals referring to like elements). Encapsulated liquid crystal structure 8 comprises a containment medium 10 having distributed therein plural volumes of liquid crystal composition 11 and is positioned between top and bottom electrodes 12 and 13, made for example of indium tin oxide ("ITO") or a thin metal coating. Top and bottom electrodes 12 and 13 (together with encapsulated crystal structure 8) may be supported by respective top and bottom support sheets, not shown. The support sheets may be made of a transparent material such as glass or polymer (preferably poly(ethylene terephthalate) ("PET")). A voltage source 14 is connected to electrodes 12 and 13, but with switch 15 in the open position (FIG. 1), no voltage is applied across encapsulated liquid crystal material 12. Incident light (ray A) is scattered, both backward (rays a' and a") and forward (rays b' and b"). When switch 15 is closed (FIG. 2), a voltage is applied across encapsulated liquid crystal material 8, causing molecules in liquid crystal composition 11 to align their long molecular axes with the field of the applied voltage. Owing to the match between the refractive index of containment medium 10 and the ordinary refractive index of liquid crystal composition 11, incident light (ray A) is not scattered, but is transmitted through encapsulated liquid crystal structure 8.

Pleochroic dyes have been mixed with liquid crystals to form a solution therewith. The pleochroic dye molecules generally align with the liquid crystal molecules, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination provides a mechanism for the controlled attenuation of light by absorption. (Thus, as used herein, the term "liquid crystal composition" also means, in context, a liquid crystal composition containing pleochroic dye dissolved therein.) Pleochroic dyes may be used in encapsulated liquid crystal structures to form colored displays. A display capable of displaying colored images may be formed by depositing side by side red, blue, and green pixels made from encapsulated liquid crystal structures of the corresponding color.

We have found that the performance of an LCD having encapsulated liquid crystal s structures can be improved by incorporating certain additives into the containment medium.

In one embodiment, the additive is selected from the group consisting of (i) ethylene oxide polymers and oligomers, (ii) ethylene oxide copolymers, and (iii) propylene oxide polymers. While such additives do not reduce the operating field when used in combination with a latex containment medium, such as taught in Pearlman '201, cited hereinabove, we have unexpectedly found that they do reduce the operating field when used in combination with a non-latex containment medium such as PVA. However, they may undesirably lower the voltage holding ratio (as defined hereinbelow).

While there is no hard and fast rule as to what constitutes an ethylene oxide polymer as opposed to an oligomer, generally we regard a composition having a block of about 10 or more consecutive ethylene oxide repeat units as being polymeric, and one with less than ten such repeat units as being oligomeric. Examples of suitable ethylene oxide polymers and oligomers include the poly(ethylene glycols), available as Carbowax TM Polyethylene Glycol 400 and 8000 ($HO(CH_2CH_2O)_nH$, n being about 10 and 200, respectively; from Union Carbide); the alkyl-phenyl terminated ethylene oxide polymers, available as Igepal TM CA630 and CO-430 (from GAF); tri(ethylene glycol); tetra(ethylene glycol); and ethoxylated alcohols, available as Tergitol TM 15-S and TMN-3 (from Union Carbide) and Surfynol TM 420 and 485 (from Air Products).

Examples of suitable ethylene oxide copolymers include ethylene oxide-propylene oxide block copolymers, available as Tetronic TM 702 and 704 and Pluronic TM 10R5, P103, L62, L44, L122, L121 and 31R1 (all from BASF) and as Voranol 5287, 2103, and 3137 (from Dow Chemical); silicone-poly(ethylene oxide) graft copolymers, available as Silwet ™ L7614, L7607, and L77 (from Union Carbide); and tetrafluoroethylene-ethylene oxide copolymers, available as Zonyl ™ FSN (from du Pont).

A suitable propylene oxide polymer is poly(propylene glycol), available as Niax ™ polyol PPG425 (from Union Carbide).

Exemplary diols (I) include:

$$\underset{\underset{CH_3}{|}}{HC}-CH_2-\underset{\underset{OH}{|}}{\overset{\overset{CH_3}{|}}{C}}-C\equiv C-\underset{\underset{OH}{|}}{\overset{\overset{CH_3}{|}}{C}}-CH_2-\underset{\underset{CH_3}{|}}{CH} \quad \text{(Ia)}$$

$$CH_3-CH_2-\underset{\underset{OH}{|}}{\overset{\overset{CH_3}{|}}{C}}-C\equiv C-\underset{\underset{OH}{|}}{\overset{\overset{CH_3}{|}}{C}}-CH_2-CH_3 \quad \text{(Ib)}$$

$$\underset{\underset{CH_3}{|}}{HC}-CH_2-CH_2-\underset{\underset{OH}{|}}{\overset{\overset{CH_3}{|}}{C}}-C\equiv C-\underset{\underset{OH}{|}}{\overset{\overset{CH_3}{|}}{C}}-CH_2-CH_2-\underset{\underset{CH_3}{|}}{CH} \quad \text{(Ic)}$$

$$\underset{\underset{OH}{|}}{\overset{\overset{CH_3}{|}}{HC}}-CH_2-\underset{\underset{OH}{|}}{\overset{\overset{CH_3}{|}}{C}}-CH_2-CH_2-\underset{\underset{OH}{|}}{\overset{\overset{CH_3}{|}}{C}}-CH_2-\underset{\underset{CH_3}{|}}{CH} \quad \text{(Id)}$$

$$(CH_3)_2CH-\underset{\underset{OH}{|}}{CH}-\underset{\underset{CH_3}{|}}{\overset{\overset{CH_3}{|}}{C}}-CH_2OH \quad \text{(Ie)}$$

and $$CH_3-CH_2-CH_2-\underset{\underset{OH}{|}}{CH}-CH_2-\underset{\underset{OH}{|}}{CH}-\overset{\overset{CH_2-CH_3}{|}}{CH_2} \quad \text{(If)}$$

Diols Ia, Ib, and Ic are available as Surfynol ™ 104, 82, and 124, respectively, neat or combined with a carrier, from Air Products. Among the diesters of diols (I) which are suitable, the diacetate esters are preferred.

Exemplary phenolic compounds (II) include:

$$(CH_3)_3C-CH_2-\underset{\underset{CH_3}{|}}{\overset{\overset{CH_3}{|}}{C}}-\underset{\phantom{xx}}{\phantom{xx}}-OH \quad \text{(IIa)}$$

-continued (IIb) 2,6-di-t-butyl-4-methylphenol structure with C(CH$_3$)$_3$ groups ortho to OH and H$_3$C para.

(IIc) catechol with (CH$_3$)$_3$C and C(CH$_3$)$_3$ substituents.

Exemplary benzylic alcohols (III) include:

(IIIa) 1,4-phenylene bis[HO-C(CH$_3$)(C(CH$_3$)$_3$)-]

(IIIb) CH$_3$(CH$_2$)$_3$— phenyl —C(CH$_3$)(CH$_2$CH$_3$)OH (IIIc) CH$_3$(CH$_2$)$_3$— phenyl —C(CH$_3$)(CH$_2$CH(CH$_3$)$_2$)OH (IIId) (CH$_3$)$_2$CH—CH$_2$— phenyl bis[—C(CH$_3$)(OH)CH$_2$—CH(CH$_3$)$_2$]

and (IIIe) (CH$_3$)$_2$CH—CH$_2$—CH$_2$— phenyl —[C(CH$_3$)(OH)] with CH$_2$—CH$_2$—CH(CH$_3$)$_2$ Exemplary cyanurate compounds (IV) include:

(IVa) tris-cyanurate with three O—CH$_2$—(CF$_2$)$_5$—CF$_2$H groups (IVb) tris-cyanurate with three O—(CH$_2$)$_6$—CH$_3$ groups

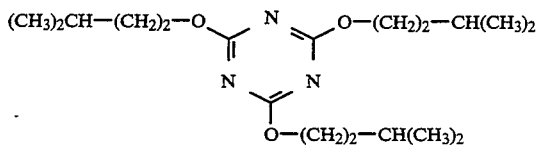

(IVc)

and

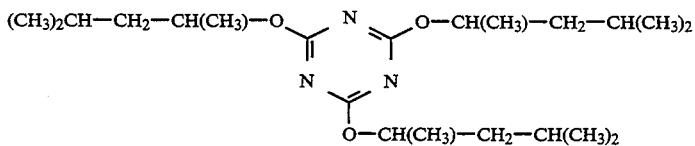

(IVd)

Exemplary alcohols (V) include $CF_3(CF_2)_6CH_2OH$, n-octanol,

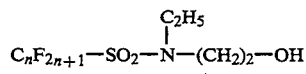

(Va)

(n being an integer between 1 and 12)

$HO-CH_2-CH_2-O-CH_2-C\equiv C-CH_2-O-CH_2-CH_2-OH$ (Vh)

and

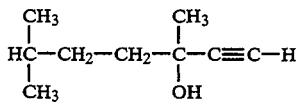

(Vc)

An exemplary preferred diketone (VI) is

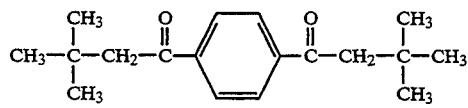

(VIa)

In another embodiment, the additive is a long-chain alkyl ester of a polyol, such as sorbitan monolaurate and sorbitan trioleate, available as Span TM 80 and Span TM 85 from ICI Americas, glycerol mono-oleate, and triglycerol diisostearate.

The additive may also be a silane coupling agent such as methacryloxypropyltrimethoxysilane and N-phenylaminopropyltrimethoxy silane.

Exemplary carboxylic acids (VII) include n-heptanoic acid, t-butyl acetic acid, 2-propylpentanoic acid, and

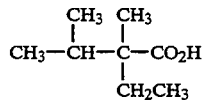

(VIIa)

In a preferred embodiment, the additives of this invention have a polar functionality selected from the group consisting of hydroxyl, carbonyl, carboxylic acid, ester, and nitro and further have at least one $C_5-C_{15}$ branched alkyl group having at least two methyl groups therein.

Generally, the additives may be used in relatively low amounts, between 0.1 and 20 pph (parts per hundred), preferably 0.2 and 10 pph, per one hundred parts by weight of containment medium and liquid crystal composition. Mixtures of different additives may be used.

The voltage needed to switch from a field-off to a field-on condition depends on a number of parameters including but not limited to the thickness of the film, the size distribution of the liquid crystal volumes within the containment medium, and the properties (dielectric constant, dielectric anisotropy, elastic constant, etc.) of the liquid crystal composition. For many applications it is desirable that the structure have a switching voltage which enables it to develop good contrast and brightness at less than 20 volts, preferably less than 10 volts, and most preferably less than 5 volts. The present invention enables the preparation of encapsulated liquid crystal displays operating at less than half the operating voltage of comparable prior an displays, with little or no loss of optical contrast or brightness. By a reduction of a specified percentage in the operating voltage, we mean that the operating voltage of a display is reduced by the specified percentage compared to an otherwise identical display in which the additive means is absent.

A film made from encapsulated liquid crystal structures may show hysteresis in its optical response—the optical response of a film at a given voltage depends on whether the film reached the given voltage from a previously higher or lower voltage. Many displays are designed such that a given electrical signal (voltage) should correspond to a desired optical response. Hysteresis degrades the ability of the device to accurately reach that desired optical response. This would have the effect of lowering the number of gray levels in a high resolution display. One way to measure the hysteresis of a film is to ramp the voltage applied to the sample up and then down to compare optical response curves. The greater the difference between the up and down curves, the greater the hysteresis. The hysteresis value for a film will depend strongly on the times and voltages used in the test. For most applications, it is desired to have the hysteresis as low as possible: less than 20% difference, with less than 6% preferred. Prior art encapsulated liquid crystal displays can show very large hysteresis, sometimes greater than 100%. The present invention enables the preparation of encapsulated liquid crystal displays having significantly reduced hysteresis.

The switching speed is a measure of the time for a film of encapsulated liquid crystal structure to turn on or off with the application or removal of a voltage. One way to measure switching speed is to monitor the optical response of the film while applying and then removing a voltage. The time it takes for the film to reach 90% of its final response when the voltage is applied is commonly referred to as the "on time", while the time for the film to drop to 10% of its response upon removal of the voltage is commonly referred to as the "off-time". The measured switching speeds will depend on the voltage applied. For displays which show moving graphics it is desirable to have on and off times of less than 50 msec. If the switching speeds are much slower, blurring of the moving images results. For "frame-sequential" displays, faster switching speeds (e.g. less than 5 msec) are desired in order to obtain good color purity.

While we do not wish to be bound by theory, it is our belief that the additives improve performance by modifying the interface between the liquid crystal composition and the containment medium. In the absence of an applied voltage, the orientation of the liquid crystal composition at the interface with the containment medium is strongly affected by the nature of the interface. Changes in the chemical make-up of the interface can directly affect the anchoring strength of the liquid crystal composition. The anchoring strength is a measure of how much force is required to bend the director of the liquid crystal molecules away from their preferred orientations at the surface. Changing the anchoring strength can affect not only the molecules' rotation in the field, but also the energy needed to move defects (disclinations), the preferred tilt angle, and even the preferred orientation of the liquid crystal molecules within a droplet or volume (radial, bipolar, etc.). We believe that the additives act by changing the chemical and physical nature of the liquid crystal composition-containment medium interface.

While the anchoring strength of liquid crystals can be measured in conventional liquid crystal devices, there has not yet been a quantitative experimental procedure described for of the measurement of anchoring strength of a liquid crystal in encapsulated liquid crystal structures. Still, one can qualitatively examine the effect of additives of this invention on the anchoring strength by measuring how the voltage reduction in encapsulated structures depends on the average cavity size containing the liquid crystal material. The ratio of the cavity surface area to the cavity volume will increase with decreasing cavity size; that is, the surface to volume (S/V) ratio will be larger for smaller cavities than it will for larger cavities. Since the relative importance of anchoring energy will depend on the relative surface area of the cavity, one would expect that the additive means will be more effective in lowering the voltage of encapsulated liquid crystal structures having small cavities, compared to those having larger cavities. This argument is analogous to a common method of measuring anchoring energies in conventional liquid crystal cells (see "Anchoring strength coefficient of a monomer and its dimer at a polymer-coated interface", G. A. DiLisi et al., *Liquid Crystals*, (1992), 11, pp. 63–71.) In this method, the anchoring energy is measured by determining the difference in voltage required to orient a liquid crystal in a device with a small cell gap, compared to a large cell gap. Unless the anchoring energy is infinite, the small cell gap device invariable possesses a lower operating voltage than the large cell gap device.

A preferred LCD is of the active matrix type, in which each pixel (or picture element) is driven (switched from one visual state to another) by an active switching element such as a thin film transistor ("TFT"), varistor, diode, or metal-insulator-metal element ("MIM"). The switching element helps eliminate cross-talk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching elements of sufficiently small size, high resolution displays are possible. Active matrix displays are important for television, computer, and instrument screens. Active matrix displays employing liquid crystal structures are disclosed in Becker et al., U.S. Pat. No. 5,124,822 (1992), and Kamath et al., U.S. application Ser. No. 07/806,573, filed Dec. 12, 1991 now U.S. Pat. No. 5,233,445, the disclosures of which are incorporated herein by reference.

The practice of this invention may be further understood by reference to the following examples, which are provided means of illustration and not of limitation.

The following general procedures were used in the examples. Optical measurements were obtained with f/3.5 collection optics and a collimated $550 \pm 40$ nm light source. (Samples containing dye were measured with f/0 optics.) In order to measure $T_{on}$ and the operating field $E_{90}$ of an encapsulated liquid crystal structure, samples were stepped up and down in voltage (25 steps up/25 steps down, 0.7 sec per step) to a relatively high field (typically 8–10 V/$\mu$m). For each test, the maximum in transmission is defined as $T_{on}$ and $T_{off}$ is the percent transmission in the absence of applied voltage. The value $T_{90}$ is given by the equation $$T_{90} = 0.9(T_{on} - T_{off}) + T_{off}$$

The applied field needed to reach $T_{90}$ on the up curve is $E_{90}$ (the up curve being the % T/V curve obtained with increasing voltage). Preferably, the encapsulated liquid crystal structures of this invention (and the corresponding displays) have an operating field $E_{90}$ which is at least 10%, more preferably at least 20%, and most preferably at least 50% lesser than the operating field $E_{90}$ of a control structure or display in which the field-reducing additive means is not present. Hysteresis was measured in a test in which the sample is ramped 25 steps up then 25 steps down in voltage (0.7 sec per step), typically to a maximum voltage which applies the field $E_{90}$ to the film. The hysteresis value quoted in the examples is $\Delta T/T_{avg}$ at $E_{50(avg)}$. $E_{50(avg)}$ is the linear average of $E_{50(up)}$ and $E_{50(down)}$. $E_{50(up)}$ and $E_{50(down)}$ are the fields needed to reach $T_{50}$ for the up and down curves, respectively. $T_{50}$ is defined by the equation $$T_{50} = 0.5(T_{on} - T_{off}) + T_{off}$$

$\Delta T$ is the difference in transmission between the up and down curves ($T_{(E50(avg),down)}$ minus $T_{(E50(avg),up)}$) at $E_{50(avg)}$ and $T_{avg}$ is given by the equation $$T_{avg} = \frac{T_{(E50(avg), down)} + T_{(E50(avg), up)}}{2}$$

These definitions may be further understood by reference to the diagrammatic representation in FIG. 3. Note that $E_{90}$ is an electric field value which has units of volts/$\mu$m and is substantially independent of sample thickness, while the corresponding operating voltage $V_{90}$ is thickness dependent and has units of volts. $V_{90}$ is obtained by multiplying $E_{90}$ by the thickness t (in μm) of the encapsulated liquid crystal structure:

$$V_{90} = t \cdot E_{90}$$

Switching speeds were obtained by giving a sample a 1 sec, 400 Hz square wave signal at $E_{90}$. The time for the sample to go from $T_{10}$ to $T_{90}$ is the rise time; the time for the sample to turn off from $T_{90}$ to $T_{10}$ is the fall time.

The voltage holding ratio of encapsulated liquid crystal structures was measured as follows. A sample of encapsulated liquid crystal structure was mounted between two electrodes and a series of alternating polarity voltage pulses was applied. The pulses were 30–300 μsec in duration and were applied every 15 msec. During the 15 msec hold time the sample was held in open circuit and the decay of the applied voltage across the sample was monitored. The voltage holding ratio (VHR) is defined as the percentage of the originally applied voltage which remained at the end of the 15 msec hold time. The measurement was taken at "steady state," which for most samples was attained before 20 pulses. Larger values of VHR are more desirable. The test was normally performed at or above the field at which the sample achieved 90% of its maximum transmission, i.e., at or above $E_{90}$. Displays of this invention preferably have a VHR which is at least 50%, more preferably at least 80%, and most preferably at least 90%.

In a preferred embodiment, a display made with an encapsulated liquid crystal structure containing an additive of this invention has rise and/or fall times which are at least 10%, preferably at least 50% faster compared to those of an otherwise identical reference display in which the encapsulated liquid crystal structure does not contain any additive.

In another preferred embodiment, a display made with an encapsulated liquid crystal structure containing an additive of this invention shows a hysteresis reduction of at least 10%, preferably at least 20%, compared to the hysteresis of an otherwise identical reference display in which the encapsulated liquid crystal structure does not contain any additive.

EXAMPLE 1

Ethylene oxide-propylene oxide block copolymer (Pluronic TM L44, from Union Carbide; 0.012 g) was weighed into a 30 mL polyethylene beaker. PVA (Airvol TM from Air Products, 88% hydrolyzed, 11% aqueous, 3.700 g) was added and the two components were mixed by swirling. Next, liquid crystal (E49, from Merck Ltd., U.K., 2.000 g) was added and the three-component component mixture was emulsified. The resulting emulsion had 42 wt. % total solids (liquid crystal plus PVA), with a liquid crystal to PVA ratio of 83:17. The volume median droplet diameter was determined by a Coulter Counter to be about 2.7 μm volume percent median. The emulsion was coated onto an ITO-coated PET substrate and allowed to dry for over an hour. A second PET/ITO substrate was then laminated on top of the dried film. A control film was made in the same manner but without the block copolymer. The block copolymer containing sample required 3.0 V/μm to turn on to 90% of saturation. The control sample required 5.25 V/μm to turn on to the same level. The hysteresis of the film containing the block copolymer was 22%, while that of the control film was ±77 %.

The above procedure was repeated with additional additives. Where the additive was a solid, a 10 wt. % aqueous solution was made up in deionized water. Where the additive had a low (<7) hydrophile-lyophile balance (HLB), it was mixed with the liquid crystal first, after which the containment medium was added. Control films (without the additive) having droplet sizes and thicknesses comparable to each of the additive-containing films were made. The results are summarized in Table I, which shows the lower operating fields and/or hysteresis of the samples containing additives in accordance with this invention.

TABLE I

| Additive | Amt.[a] (pph) | Sample Field $E_{90}$[b] | Sample Hysteresis (%)[c] | Control Field $E_{90}$[b] | Control Hysteresis (%)[c] | Ratio (Sample/control) Field $E_{90}$[b] | Ratio (Sample/control) Hysteresis[c] |
|---|---|---|---|---|---|---|---|
| Pluronic 10R5 | 0.5 | 2.58 | 23.6 | 5.85 | 77.3 | 0.44 | 0.31 |
| Tetronic 702 | 0.5 | 2.68 | 33.2 | 5.25 | 77.4 | 0.51 | 0.43 |
| Pluronic L44 | 0.5 | 2.7 | 21 | 5.25 | 77.4 | 0.51 | 0.27 |
| Pluronic L62 | 0.5 | 2.88 | 24.2 | 5.25 | 77.4 | 0.55 | 0.31 |
| Pluronic L44 | 0.5 | 2.95 | 18.6 | 5.25 | 77.4 | 0.56 | 0.24 |
| Tetronic 704 | 0.5 | 3.08 | 32.6 | 5.25 | 77.4 | 0.59 | 0.42 |
| Pluronic P105 | 0.5 | 3.25 | 31.7 | 5.25 | 77.4 | 0.62 | 0.41 |
| Surfynol 485 | 0.5 | 3.42 | 33.3 | 5.25 | 77.4 | 0.65 | 0.43 |
| Pluronic P103 | 0.5 | 3.52 | 26.2 | 5.25 | 77.4 | 0.67 | 0.34 |
| Pluronic L44 | 0.1 | 3.64 | 59.6 | 5.32 | 72.4 | 0.68 | 0.82 |
| Silwet L77 | 0.5 | 4.04 | 59.2 | 5.85 | 77.3 | 0.69 | 0.77 |
| PPG 400 | 1.0 | 3.88 | 73 | 5.25 | 77.4 | 0.74 | 0.94 |
| Silwet L7607 | 0.5 | 3.91 | 49.6 | 5.25 | 77.4 | 0.74 | 0.64 |
| Silwet L7614 | 0.5 | 3.88 | 42.8 | 5.19 | 70.4 | 0.75 | 0.61 |
| Surfynol 420 | 0.5 | 4.05 | 67.3 | 5.25 | 77.4 | 0.77 | 0.87 |
| Surfynol 104H | 0.5 | 4.71 | 88.3 | 5.83 | 85.2 | 0.81 | 1.04 |
| Igepal 420 | 0.5 | 4.64 | 70.1 | 5.85 | 77.3 | 0.79 | 0.91 |
| Pluronic L122 | 0.5 | 4.84 | 85.6 | 5.83 | 85.2 | 0.83 | 1.00 |
| Pluronic 31R1 | 0.5 | 4.86 | 83.6 | 5.83 | 85.2 | 0.83 | 0.98 |
| Pluronic L44 | 0.1 | 4.45 | 58.9 | 5.32 | 72.4 | 0.84 | 0.81 |
| Zonyl FSN | 0.5 | 5.08 | 55.6 | 5.85 | 77.3 | 0.87 | 0.72 |
| Zonyl FSO | 0.5 | 5.23 | 62.3 | 5.85 | 77.3 | 0.89 | 0.81 |
| Igepal CA-630 | 0.5 | 5.41 | 45.3 | 6.03 | 84.1 | 0.90 | 0.54 |
| Span 80 | 0.5 | 4.57 | 93.4 | 5.85 | 77.3 | 0.78 | 1.21 |
| Surfynol 104H | 1.0 | 3.81 | 76.7 | 5.82 | 85.2 | 0.65 | 0.90 |

TABLE I-continued

| Additive | Amt.[a] (pph) | Sample Field $E_{90}$[b] | Sample Hysteresis (%)[c] | Control Field $E_{90}$[b] | Control Hysteresis (%)[c] | Ratio (Sample/control) Field $E_{90}$[b] | Ratio (Sample/control) Hysteresis[c] |
|---|---|---|---|---|---|---|---|
| Span 80 | 1.0 | 3.84 | 94.6 | 4.7 | 74 | 0.82 | 1.28 |

[a] Per one hundred parts by weight of liquid crystal composition plus containment medium
[b] Volts/μm at 90% of saturation
[c] $\Delta T/T_{avg}$ at $E_{50(avg)}$

EXAMPLE 2

In this example the additive is added after the formation of the emulsion. PVA (Airvol ™ 205, from Air Products, 11% aqueous, 5.400 g) was weighed into a 30 mL polypropylene beaker, followed by liquid crystal (E49, 2.900 g). The two were emulsified as in Example 1. The droplet size was about 2.4 μm volume percent median. This masterbatch was divided into portions, and additives were mixed into each portion of the emulsion. The emulsions were each coated onto an ITO coated PET substrate and allowed to dry for over 1 hr. A second PET/ITO substrate was then laminated on top of the dried film. Control samples were made in the same manner, but without the additive. Table 2 summarizes the results obtained.

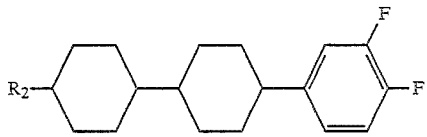

(C)

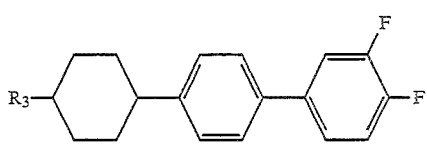

(D)

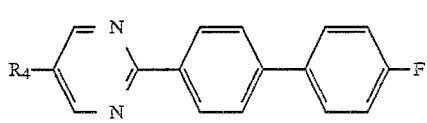

(E)

TABLE II

| Additive | Amt.[a] (pph) | Sample Field $E_{90}$[b] | Sample Hysteresis (%)[c] | Control Field $E_{90}$[b] | Control Hysteresis (%)[c] | Ratio (Sample/control) Field $E_{90}$[b] | Ratio (Sample/control) Hysteresis[c] |
|---|---|---|---|---|---|---|---|
| PEG-400 | 2 | 2.77 | 10.6 | 5.32 | 72.4 | 0.52 | 0.15 |
| PEG-400 | 1 | 3.22 | 15.7 | 6.03 | 84.1 | 0.53 | 0.19 |
| PEG-400 | 0.66 | 3.34 | 14.3 | 6.03 | 84.1 | 0.55 | 0.17 |
| PEG-400 | 0.5 | 3.23 | 26.7 | 5.25 | 77.4 | 0.62 | 0.34 |
| PEG-400 | 4 | 3.37 | 9.1 | 5.32 | 72.4 | 0.63 | 0.13 |
| PEG-400 | 0.33 | 3.74 | 32.1 | 5.25 | 77.4 | 0.71 | 0.41 |
| PEG-400 | 0.33 | 4.31 | 28.5 | 6.03 | 84.1 | 0.71 | 0.34 |
| Tetraethylene glycol | 1 | 4.44 | 56.2 | 5.83 | 85.2 | 0.76 | 0.66 |
| PEG-400 | 6 | 4.07 | 27.4 | 5.32 | 72.4 | 0.77 | 0.38 |
| Triethylene glycol | 1.17 | 4.51 | 58.5 | 5.83 | 85.2 | 0.77 | 0.69 |
| Diethylene glycol | 1 | 4.81 | 77.9 | 5.83 | 85.2 | 0.83 | 0.91 |
| PEG-400 | 0.17 | 4.45 | 48.5 | 5.25 | 77.4 | 0.85 | 0.63 |

[a] Per one hundred parts by weight of liquid crystal composition plus containment medium
[b] Volts/μm at 90% of saturation
[c] $\Delta T/T_{avg}$ at $E_{50(avg)}$

EXAMPLE 3

An emulsion of liquid crystal composition (1) in aqueous PVA (Airvol ™ 205) was prepared. Liquid crystal composition (1) is a mixture containing the following liquid crystals:

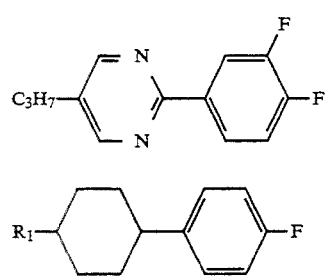

(A)

(B)

where $R_1$ is $C_3H_7$ or $C_5H_{11}$; $R_2$ is $C_2H_5$, $C_3H_7$, or $C_5H_{11}$; $R_3$ is $C_2H_5$, $C_3H_7$, or $C_5H_{11}$; and $R_4$ is $C_2H_5$, $C_3H_7$, $C_4H_9$, or $C_5H_{11}$.

The emulsion had a volume median droplet diameter of 2.5 μm, a liquid crystal to PVA ratio of 83.17, and a water content of 60%. The emulsion was divided into two portions. To one portion was added a 25% solution of Surfynol ™ 104 in ethanol (amount of Surfynol ™ 104 = 4.3 pph per one hundred parts by weight of liquid crystal plus PVA). The additive-containing and the untreated portions were coated onto ITO-coated PET to a dry thickness of about 10 μm. Another ITO/PET sheet was laminated over the top to make the respective final devices. The films were opalescent (light scattering) and cleared upon the application of an electric field. The Surfynol ™ -containing sample had an operating field $E_{90}$ of 0.8 V/μm, while the control sample (i.e., without Surfynol ™ ) had an operating field $E_{90}$ of 3.3 V/μm. The voltage holding performance of the additive-containing sample was 87%, while that of the control was 89% (tested at 100 V). The hysteresis of the film containing the additive was less than 20% of that of the control. The additive exhibited an unusual clearing effect, that is, when it was brought to 0° C. it became clear even without the application of an electric field and became scattering again when warmed back up to room temperature.

The emulsion containing the additive was diluted with 20% aqueous PVA saturated with Surfynol 104 in order to obtain a level of liquid crystal of 0.5 weight % based on PVA. The diluted emulsion was coated to a dry thickness of about 6 μm and observed under a microscope with crossed polarizers at 1500 X. The droplets in a similarly control sample (but without the additive) had the well-known "in-plane-bipolar" orientation. The droplets in the additive containing sample appeared very different in that they contained no obvious defect structure.

A similarly prepared emulsion from liquid crystal (1) and PVA, but containing Surfynol 104H at a 2 pph level (per hundred parts by weight of emulsion) had a surface tension of 33.6 dyne/cm as prepared and 34.2 dyne/cm after 15 hr. For comparison, a control sample (without the Surfynol 104H) had a surface tension of 49.8 dyne/cm.

EXAMPLE 4

PVA (Airvol TM 205, 10% aqueous, 7.400 g) was weighed into a 50 mL polypropylene beaker together with liquid crystal (2) and emulsified as in Example 1. Liquid crystal (2) is a mixture containing liquid crystal compounds (A), (D) ($R_3=C_2H_5$, $C_3H_7$, or $C_5H_{11}$), (E)($R_4=C_3H_7$, $C_4H_9$, or $C_5H_{11}$) and additionally liquid crystal compounds of the following structures:

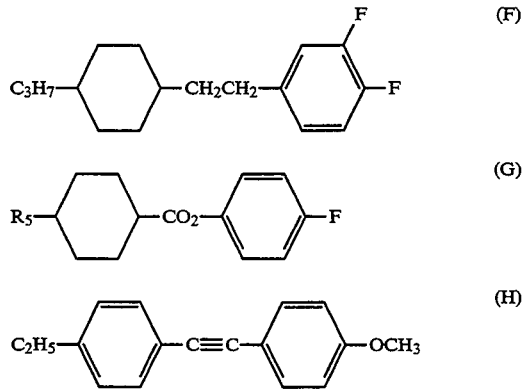

where $R_5$ is $C_5H_{11}$ or $C_7H_{15}$.

The droplet size was 2.3 μm volume percent median. Solids content was 39.5 wt. % with a liquid crystal-PVA ratio of 83:17. This masterbatch was divided into two portions. To one portion of the emulsion was added ethylene oxide-propylene oxide block copolymer (Pluronic L44) at 2% emulsion weight. A control sample contained no additive. Films were made from these emulsions as described in Example 1. $E_{90}$ for the sample containing the additive was 1.73 V/μm, while $E_{90}$ for the control was 3.8 V/μm. The hysteresis for the additive-containing sample was 27% and for the control was 43%. The rise and fall times for the additive containing sample were 14 and 6 msec, respectively, while the rise and fall times for the control were 21 and 41 msec, respectively.

EXAMPLE 5

An emulsion of liquid crystal (1) in aqueous PVA (Airvol TM 205) was made with a median droplet diameter of 2.1 μm, a liquid crystal to PVA ratio of 83:17, and a water content of 60%. The emulsion was divided into three portions. To the first portion was added a 50% solution of 2,5-dimethyl-3-hexyne-2,5-diol in ethanol (4.3 pph per one hundred parts by weight of liquid crystal plus PVA). To the second portion was added a 50% solution of $CF_3(CF_2)_6CH_2OH$ in ethanol (4.1 pph). The third did not receive any additives and was used as a control. Each portion was coated onto an ITO-coated PET substrate to a dry thickness of 6-12 μm and another ITO/PET sheet was laminated over the top to make the respective first, second and third (control) devices. The operating fields $E_{90}$ were 1.9, 2.3, and 3.2 V/μm, respectively. The hysteresis in the first and second devices were 20% and 70%, respectively, of that of the control device. The first device had switching speeds of 14 msec (rise) and 7 msec (fall). The second device had switching speeds of 20 msec (rise) and 11 msec (fall). The third device had switching speeds of 42 m sec (rise) and 21 msec (fall).

EXAMPLE 6

An emulsion of liquid crystal (1) in aqueous PVA (Airvol TM 205) was made with a volume median droplet diameter of 2.5 μm, a liquid crystal to PVA ratio of 83:17, and a water content of 60%. The emulsion was divided into portions, to one of which was added a 25% solution of 1-octanol in ethanol (amount of 1-octanol 4.1 pph, per one hundred parts by weight of liquid crystal and PVA). The additive containing and untreated (control) portions were coated onto ITO-coated PET substrates to a dry thickness of about 10 μm. Another ITO/PET sheet was laminated over the top to make the final device. The films, which were opaque (scattering) and cleared upon the application of an electric field, had operating fields $E_{90}$ of 1.8 V/μm and 3.3 V/μm for the test and control, respectively. The voltage-holding performances of the test and the control films were both 90% (percent of voltage held at the end of 15 msec, tested at 100 V). The hysteresis of the test film was less than 70% of that of the control.

EXAMPLE 7

An emulsion of liquid crystal (1) in aqueous PVA (Airvol TM 205) was mixed in ethanol/water to a volume median diameter of 2.5 μm. It was pelletized via centrifugation as described in the aforementioned U.S. application Ser. No. 07/834,438 of Wartenberg et al., and worked up in water to a liquid crystal to PVA ratio of 83:17, and a water content of 60%. The emulsion was divided into portions. To a first portion was added a 25% solution of sorbitan trioleate (Span TM 85, ICI Americas) in ethanol, at 3.6 pph (per one hundred parts by weight of liquid crystal plus PVA). To a second portion was added a 25% solution of glycerol monooleate (Emerest TM 2421, Henkel) in ethanol at 3.3 pph. To a third portion was added a 25% solution of triglycerol diisostearate (Emerest TM 2452, Henkel) in ethanol at 3.7 pph. A fourth portion was untreated and used as a control. The various portions were coated onto ITO/PET sheet to a dry thickness of about 10 μm and another ITO/PET sheet was laminated on top. The $E_{90}$ and hysteresis data for these samples is shown in Table III.

TABLE III

| Additive [a] | Amt. [a] (pph) | Sample Field $E_{90}$ [b] | Sample Hysteresis (%) [d] | Control Field $E_{90}$ [c] | Control Hysteresis (%) [d] | Ratio (Sample/control) Field $E_{90}$ [c] | Ratio (Sample/control) Hysteresis [d] |
|---|---|---|---|---|---|---|---|
| Span 85 (6.7) | 3.6 | 1.97 | 42.9 | 2.52 | 56 | 0.78 | 0.77 |
| Emerest 2421 (6.2) | 3.3 | 1.04 | 38.5 | 2.52 | 56 | 0.41 | 0.69 |
| Emerest 2452 (4.0) | 3.7 | 1.08 | 18.8 | 2.35 | 37.4 | 0.46 | 0.50 |

[a] Film thickness in μm given in parentheses
[b] Per one hundred parts by weight of liquid crystal composition plus containment medium
[c] Volts/μm at 90% of saturation
[d] $\Delta T/T_{avg}$ at $E_{50(avg)}$

EXAMPLE 8

Pleochroic black dye (2.2% by weight, black blend KKD-602, Showa Kako Ltd, Japan) was weighed into a borosilicate vial containing liquid crystal (1). This mixture was stirred with a magnetic stir bar for about 48 hr at 60°–65° C. The mixture was held at room temperature for another 48 hr, after which it was filtered through a 0.6 μm Nucelopore ™ filter. PVA (Airvol ™ 205, 10 w % solution in 50:50 w:w water:ethanol, 40 g) was weighed into a 100 mL polypropylene beaker together with the dye-liquid crystal mixture (20 g) and emulsified to a 2.9 μm volume median droplet diameter with a propeller blade. The emulsion was diluted with water to give a 75:25 water:ethanol ratio and was centrifuged to separate the emulsion pellet from the carrier medium. The pellet was dispersed into a 10% PVA aqueous solution to give an 83:17 ratio of liquid crystal to PVA solids and a total solids level of 40%.

This masterbatch was divided into four portions of about 10 g each. One portion was used as a control. Surfynol ™ 104H was added to the other portions at 1.50, 1.75, and 2.00% levels (expressed as pph of emulsion). Each portion, contained in a borosilicate vial, was shaken by hand for 1 min, and then slowly mechanically rotated for another 2 hr. Test cells were made by coating the emulsions onto ITO coated glass followed by cutting and laminating to cut ITO patterned glass at 60° C. The results are provided in Table IV.

TABLE IV [a]

| Additive (pph) [b] | Thickness (μm) | $T_{off}$ (%) | $T_{on}$ (%) | Field $E_{90}$ [c] | $\Delta T/T_{avg}$ | Rise Time (msec) [d] | Fall Time (msec) [d] |
|---|---|---|---|---|---|---|---|
| 0 | 5.3 | 27.7 | 67.7 | 2.98 | 26.23 | 2.0 | 348.6 |
| 1.5 | 5.1 | 27.3 | 69.8 | 2.39 | 11.89 | 1.4 | 17.5 |
| 1.75 | 6.0 | 21.6 | 65.9 | 2.35 | 13.31 | 2.2 | 17.1 |
| 2.0 | 5.2 | 25.3 | 68.9 | 2.06 | 15.38 | 1.3 | 15.4 |

[a] Optical measurements done with f/0 optics
[b] Per one hundred parts by weight of liquid crystal, PVA, and carrier medium
[c] Volts/μm at 90% of saturation
[d] 1 sec, 33 Hz switching speed test at 30 V

EXAMPLE 9

Generally, as the thickness of the encapsulated liquid crystal structure is increased the contrast ratio CR also increases, CR being defined as $$CR = \frac{T_{on}}{T_{off}}$$

However, increasing the thickness of the encapsulated liquid crystal structure also increases the voltage needed to switch it on and off, an undesirable result. Thus, it is desirable to develop encapsulated liquid crystal structures leading to devices having improved contrast ratio without having an increased operating voltage. An expression which provides a relatively thickness-independent measure of the performance of encapsulated liquid crystal devices where the contrast between the off and on states is primarily attributable to light scattering in the off-state (e.g., in instances in which the liquid crystal composition is substantially free of dye) is:

$$\frac{CR}{V_{90} \cdot (f/\#)^2}$$

where CR and $V_{90}$ are as defined above, f/# is the f/number of the collection optics used for the measurements. f/# is a measure of the ability of the collection optics to detect the light scattered by the encapsulated liquid crystal structure and may be more readily understood by reference to FIGS. 4a–b. FIG. 4a shows device 20 comprising encapsulated liquid crystal structure 21 sandwiched between a front electrode 22 and a rear electrode 23. Voltage from voltage source 24 is applied or not across encapsulated liquid crystal structure 21 depending on the position of switch 25. Collimated light C from light source 26 is incident on device 20 and is forward scattered by encapsulated liquid crystal structure 21 (rays C'). (There may also be some backwards scattering, not shown.) The amount of light reaching detector 27 is dependent on its diameter d and its distance D from encapsulated liquid crystal structure 21. For a given diameter d, it is evident that the closer detector 27 is (i.e., the smaller distance D is), the more light will be detected. Conversely for a given distance D, a detector 27 with larger diameter d will detect more light than one with a smaller diameter d. FIG. 4b shows the same set-up with switch 25 closed. Now device 20 is substantially transparent to incident light C, all of which (excepting minor amounts of residual scattering and/or absorption, not shown) reaches detector 27. f/# may be expressed as the ratio D/d:

$$f/\# = \frac{D}{d}$$

We have discovered, in another embodiment of the invention, that preferred displays of this invention satisfy the inequality using liquid crystal RY1007 from Chisso and PVA as the containment medium, in a weight ratio of 83:17 liquid crystal:PVA.

TABLE V

| Run | Additive[a] | Amount[b] | $E_{90}$ (V/μm) | $\frac{CR}{V_{90} \cdot (f/\#)^2}$ | VHR at $V_{90}$ (%) | Hysteresis (relative) | Device Clearing Point (°C.) |
|---|---|---|---|---|---|---|---|
| 1 | Control | 0 | 3.97 | 0.06 | 95.6 | 1.00 | 78 |
| 2 | Ia[c] | 3.9 | 1.26 | 0.12 | 86.8 | 0.34 | 73 |
| 3 | IIIa | <4 | 2.92 | 0.08 | 96.1 | 1.19 | 76 |
| 4 | IIIb | 3.8 | 2.05 | 0.1 | 94.5 | 0.86 | 66 |
| 5 | IIIc | 3.8 | 1.92 | 0.1 | 94.6 | 0.83 | 64 |
| 6 | IIId | 4 | 1.67 | 0.12 | 89.1 | 0.51 | 65 |
| 7 | IIIe | 4 | 1.55 | 0.14 | 92 | 0.55 | 65 |
| 8 | IIIe | 4 | 1.46 | 0.14 | 90.2 | 0.51 | 65 |
| 9 | IIa | 4 | 1.46 | 0.12 | 84 | 0.43 | 59 |
| 10 | Vd | 4 | 2.93 | 0.09 | 95.6 | 1.09 | — |
| 11 | IIb | 4 | 2.13 | 0.09 | 81.7 | — | — |
| 12 | Ic | 3.9 | 2.03 | 0.14 | 76.3 | 0.57 | — |
| 13 | If | 3.9 | 1.84 | 0.12 | 44.3 | 0.52 | — |
| 14 | Vb | 4 | 3.0 | 0.11 | 11.4 | 0.77 | — |
| 15 | Va | <2 | 3.16 | 0.09 | 84.8 | 1.14 | 76 |
| 16 | IVa | <2 | 3.61 | 0.07 | 94.2 | 1.08 | — |
| 17 | IVa | <2 | 3.39 | 0.07 | 90.1 | 1.09 | — |
| 18 | IVb | 4 | 2.89 | 0.08 | 91.3 | 1.25 | — |
| 19 | IVc | 4 | 2.27 | 0.08 | 89.2 | 1.14 | — |
| 20 | IVd | 4 | 2.28 | 0.09 | 88 | 1.13 | — |
| 21 | VIa | 4.0 | 2.48 | — | — | 0.62 | — |

[a]Additive combined with liquid crystal prior to emulsification step, unless noted otherwise.
[b]Pph based on amount of liquid crystal.
[c]Additive added as ethanolic solution to already-formed emulsion.

$$\frac{CR}{V_{90} \cdot (f/\#)^2} \geq 0.11$$

for values of f/# between 3.5 and 15 measurements with 400–700 nm light.

In another aspect, nematic liquid crystal are known to undergo a "clearing" as the temperature is raised, going from a nematic to an isotropic state. This transition is referred to as the nematic-to-isotropic transition, or clearing point, of the liquid crystal. Devices comprising encapsulated liquid crystal structures undergo an analogous transition as the liquid crystal goes from its nematic to its isotropic state ("device clearing point"). In most such devices, this transition occurs at or near the nematic-to-isotropic transition temperature of the liquid crystal. At temperatures above the device clearing point, the device no longer changes its transmissivity upon the application of an electric field and is no longer operative as a display. It is therefore desirable to have a high device clearing point in order to extend the useful operating range of the device.

The device clearing point may be determined by observing the increase in transmission as the temperature is increased at a rate of 1° C. per minute. The device clearing point is designated as the temperature at the midpoint of the transition. The measurement may be carried out with a microscope with a temperature controlled stage.

Illustrative results for these embodiments are provided in Table V following for a series of experiments An encapsulated liquid structure was also prepared using an ethanol-water carrier medium followed by a centrifugation step, as taught in Warrenberg et al., U.S. application Ser. No. 07/834,438, filed Feb. 12, 1992, now U.S. Pat. No. 5,202,063, using liquid crystal RY1007 and PVA as the containment medium, in a weight ratio of 83:17 liquid crystal:PVA. The results are provided in Table Va below:

TABLE Va

| Run | Additive[a] | Amount[b] | $E_{90}$ (V/μm) | $\frac{CR}{V_{90} \cdot (f/\#)^2}$ | VHR at $V_{90}$ (%) | Hysteresis (relative) |
|---|---|---|---|---|---|---|
| 1 | Control | 0 | 2.58 | 0.11 | 96.9 | 1.00 |
| 2 | Ia | 4.25 | 1.03 | 0.18 | 93.4 | 0.40 |
| 3 | IIIe | 4 | 1.14 | 0.14 | 95.6 | 0.39 |

[a]Additive added as ethanolic solution to already-formed emulsion.
[b]Pph relative to liquid crystal composition Yet another series of experiments were performed, this time using liquid crystal RY1005 from Chisso and PVA as the containment medium, in a weight ratio of 83:17 liquid crystal:PVA. The results are provided in Table Vb.

TABLE Vb

| Run | Additive[a] | Amount[b] | $E_{90}$ (V/μm) | $\frac{CR}{V_{90} \cdot (f/\#)^2}$ | VHR at $V_{90}$ (%) |
|---|---|---|---|---|---|
| 1 | Control | 0 | 3.45 | 0.06 | 95.4 |
| 2 | Ia | 4 | 0.77 | 0.14 | 80.9 |
| 3 | Id | 4 | 0.78 | 0.13 | 82.5 |
| 4 | Ic | 3.8 | 0.46 | 0.16 | 93.1 |

[a]Additive added as ethanolic solution to already-formed emulsion.
[b]Weight % relative to liquid crystal composition

EXAMPLE 10

The above inequality and set-up are not as well suited for evaluating performance of devices where contrast between the off and on states is primarily attributable to absorption as opposed to scattering, such as would be the case where the liquid crystal material contains a pleochroic dye. A set-up for estimating the performance of such dyed systems is shown in FIG. 5 (numerals identical to those used in FIGS. 4a-b identifying equivalent elements). Detector 27' is placed flush against device 20 (i.e., the f/number is very small), to cancel out any forward scattering effects, so that the entire differential between light reaching detector 27' in the off and on states is due to absorption by the pleochroic dye, excepting for small amounts of backward scattering, again not shown.

We have found that, in another aspect of the invention, the fraction $$\frac{(T_{on})^2}{T_{off} \cdot V_{90}}$$

provides a measure of the electro-optical performance of dye-containing devices, where $T_{on}$, $T_{off}$, and $V_{90}$ are as defined previously, the measurement being done with collection optics having an f/number less than 0.2 and 400–700 nm light. For preferred devices of this invention, this fraction is at least 10% greater than for an otherwise identical reference device in which the additive means is absent. Exemplary results were provided in Table IV above and are re-cast below in Table VI in a format for direct evaluation of this relationship:

TABLE VI

| Additive (pph)[a] | $\frac{(T_{on})^2}{T_{off} \cdot V_{90}}$ | Ratio relative to control |
|---|---|---|
| 0 (control) | 10.5 | n/a |
| 1.5 | 14.6 | 1.39 |
| 1.75 | 14.3 | 1.36 |
| 2.0 | 17.5 | 1.67 |

[a]Per 100 parts by weight of liquid crystal, PVA, and carrier medium

EXAMPLE 11

In another preferred aspect of the invention, we have discovered that the additive means not only reduces the operating field $E_{90}$ of the liquid crystal device, but also increases the contact angle between the liquid crystal composition and the containment medium by more than 5°, compared to the contact angle between otherwise identical liquid crystal composition and containment medium in which the additive means is absent. It is highly unexpected that such additives would increase the contact angle, when intuitively one would expect them to actually decrease the contact angle.

A small quantity of each additive means ($\leq 0.09$ g) was measured into a glass vial. Enough liquid crystal (RY1007, from Chisso) was added to each vial so that the additive means represented 4.0% w/w (except as noted) of the mixture. Each vial was thoroughly mixed. Meanwhile, microscope slides were cleaned by rinsing with methanol, coated with a 10% w/w solution of PVA (Vinol™ 205 from Air Products) in 50/50 ethanol/water, and allowed to dry. Drops of the liquid crystal composition/additive mixture were placed on the microscope slide and contact angle measurements were made with a goniometer. The results are provided in Table VI, below.

In yet another preferred aspect of the invention, we have discovered that the additive is a non-ionic surface active agent which not only lowers the operating field $E_{90}$ by at least 10%, but also has sufficient surface activity to lower the surface tension of water by more than 10 dyne/cm (preferably more than 20 dyne/cm) when used in an amount of less than 2% w/w. Exemplary results are also provided in Table VII below.

TABLE VII

| Run | Additive Means[a] | | $E_{90}$ (v/μm)[b] | Contact Angle(°)[c] | Surface Tension (dyne/cm)[d] |
|---|---|---|---|---|---|
| 1 | None (control) | (0) | 3.98 | 16.6 | 76.5 |
| 2 | IIIa | (4) | 2.96 | 22.1 | 60 |
|   |    | (2) | — | — | 56.3 |
| 3 | IIIb | (4) | 2.06 | 15.8 | 47.8 |
|   |    | (2) | — | — | 47.9 |
| 4 | IIIc | (4) | 1.94 | 22.9 | 53.1 |
|   |    | (2) | — | — | 52.3 |
| 5 | IVc | (4) | 2.26 | 23.8 | 58.6 |
|   |    | (2) | — | — | 62.3 |
| 6 | Vb | (4) | 2.8 | 27.2 | 38.9 |
|   |    | (2) | — | — | 45.5 |
| 7 | Ie | (4) | 2.17 | 34.0 | 37.8 |
|   |    | (2) | — | — | 42.0 |
| 8 | Ia | (4) | 1.26 | 31.2 | 31 |
|   |    | (2) | 1.91 | 31.8 | 33 |

[a] Amount of additive means present given parenthetically, in % w/w.
[b] Operative field
[c] Contact angle between liquid crystal composition and PVA: estimated error about ±2%.
[d] Surface tension of water, estimated error about ±2%.

FIG. 6 is a plot of the operating field against the contact angle. FIG. 7 is a plot of the operating field $E_{90}$ against the surface tension at 2% w/w of additive means.

EXAMPLE 12

In another embodiment, the additive means is a reactive one which, subsequent to the formation of the encapsulated liquid crystal structure, can react with itself to form a higher molecular weight species which may segregate or deposit onto the walls of the containment medium surrounding the liquid crystal composition or react with functional groups in the containment medium at the interface thereof with the liquid crystal composition.

Accordingly there is provided a method of making a film of an encapsulated liquid crystal structure comprising a liquid crystal composition dispersed in a containment medium, which method comprises the steps of:

(a) adding a reactive additive means to the liquid crystal composition;

(b) forming an emulsion of the liquid crystal composition, including the reactive additive, dispersed in the containment medium;

(c) coating the emulsion onto a support sheet and drying the emulsion to form a film of encapsulated liquid crystal structure supported by the support sheet; and (d) initiating the reaction of the reactive additive means to deposit the reacted additive means on the surfaces of the containment medium in contact with the liquid crystal composition.

Inclusion of the reactive additive means imparts desirable properties to the encapsulated liquid. crystal structure, resulting in devices having lowered operating field $E_{90}$, lowered hysteresis, and faster switching speeds. It is believed that the reactive additive means caused these effects by altering the nature of the liquid crystal composition-containment medium interface.

Initiation of the reaction of the reactive additive means may be with heat or light (especially ultraviolet light), for example. Accelerators, catalysts, activators, and the like may be added to initiate and/or control the reaction of the additive. Generally, the initiation of the reaction of the reactive additive means is done after the coating of the encapsulated liquid crystal structure, but it may also be carried out on the emulsion before the coating step, i.e., step (d) may be performed before step (c).

Ordinarily the reactive additive means is added to the liquid crystal composition by forming a physical mixture (suspension) or solution thereof with the liquid crystal composition. However, other methods of addition, such as gaseous diffusion of the reactive additive means to unlaminated encapsulated liquid crystal structure are also contemplated. In other words, it is not necessary to add the reactive additive means to the liquid crystal composition before the emulsification step.

Examples of suitable reactive additive means include silane coupling agents having acrylic or methacrylic functionality, such as methacryloxypropyltrimethoxysilane; other acrylic and methacrylic compounds; epoxy compounds; aldehydes; thiol compounds, and the like.

In an example illustrating the curing of the reactive additive after coating, liquid crystal (0.5 g, E7 from Merck Ltd), bis-epoxide (0.57 g of Araldite TM GY2600 from Ciba-Geigy plus 0.33 g bis-epoxide MK-107 from Wilmington Chemical), tris-mercaptan (1.21 g, Capcure TM 3-800 from Henkel), and methylene chloride (0.15 g) were combined in a beaker. The mixture was homogenized and a 15% aqueous solution of PVA (Airvol TM 205) and water were added, in amounts sufficient to yield a 1:1 weight ratio of liquid crystal to PVA and a water content of 65%. This mixture was emulsified to give a an emulsion with 2.5 μm volume median droplet size. The emulsion was spread onto a sheet of ITO-coated PET, dried for about 0.5 hr, and laminated with a second sheet of ITO-coated PET, in each instance with the ITO coating facing the encapsulated liquid crystal structure. The device was heated in a 50° C. oven for 20–30 hr in order to cure the epoxy components. A control device was identically prepared, but with the reactive additive omitted. The operating voltage $V_{90}$ of the test device was 30 V, while that of the control was 70 V. The hysteresis of the test device was ¼ that of the control device.

In another example illustrating the curing of the reactive additive prior to coating, a first epoxy (Epon TM 828, from Shell), a second epoxy (9MK-107), tris-mercaptan (Capcure 3-800), and liquid crystal (E7) were combined in a weight ratio 2.8/9.5/17.7/70 in a beaker. This mixture was emulsified with an aqueous PVA solution to a volume median diameter of 1.8 μm. The emulsion was diluted by a factor of about 10 with warm water (40°–80° C.) and allowed to stir overnight at an elevated temperature to cure the epoxy. The material was freeze-dried, then redispersed with the appropriate amount of PVA and water to obtain a 1:1 ratio of liquid crystal to PVA and a water content of 70%. The resulting emulsion was coated onto a sheet of ITO/PET (ITO facing emulsion), allowed to dry, and laminated with a second sheet of ITO/PET. The operating voltage $V_{90}$ of the device was found to be more than 50% lower than that of a control device without the epoxy added. The hysteresis was lower than the control's by a factor greater than 5.

In yet another example, 2-ethylhexyl acrylate (10 w %, containing 3% Irgacure TM 184 photoinitiator) was dissolved in liquid crystal (RY1011, Chisso). The solution was added to aqueous PVA (Airvol TM 205) and mixed to form an emulsion with a median drop diameter of 2.3 μm and a liquid crystal:PVA ratio of 83:17. The emulsion was coated onto ITO/PET and allowed to dry open-faced to a film thickness of 10.5 μm. Another ITO/PET sheet was laminated onto the film. The film exposed to UV light at about 10 mW/cm² for 5 min to cure the acrylate. The film had an operating field $E_{90}$ of 3.3 V/μm (45% lower than a control film).

EXAMPLE 13

In another embodiment of the invention, the encapsulated liquid crystal structure exhibits a homeotropic transition temperature $T_H$ of less than 5° C. or the temperature at which the device is operated, whichever is greater. Preferably $T_H$ is in the range of −20° to +5° C. A homeotropic transition temperature is the temperature below which the liquid composition aligns itself substantially perpendicular to the walls of the containment medium (whereas above such temperature it tends to align itself substantially parallel to the walls). The homeotropic transition temperature may be readily determined because below it, the encapsulated liquid crystal structure becomes substantially clear, i.e., less non-scattering, even in the absence of an applied electric field. This clearing, homeotropic transition is not to be confused with the device clearing point discussed above in the context of Example 9.

We have discovered that, unexpectedly, the occurrence of such a transition is associated with advantageous changes in the operating field $E_{90}$ of the liquid crystal device in the normal operating temperature range of the liquid crystal device, which is between 0° and 40° C. (0° and 55° C. for certain applications, such as projection displays). These advantageous changes manifest themselves in the form of a reduced operating field $E_{90}$ and/or in the form of a flatter $E_{90}$ curve in the operating temperature range, or both. In the first manifestation, the operating field $E_{90}$ is reduced by at least 10%, compared to the operating field $E_{90}$ of an otherwise identical reference display in which the additive means is absent. In the second manifestation, the variation in the operating field $E_{90}$, as measured by the ratio $$\frac{E_{max} - E_{min}}{E_{avg}}$$

is preferably less than 0.30, more preferably less than 0.10, where $E_{avg}$, $E_{max}$, and $E_{min}$ are the average, maximum, and minimum values, respectively, of $E_{90}$ in the 10°–55° C. temperature range. A flatter $E_{90}$ curve over the operating temperature range is advantageous because the need not be designed to operate in a wide a range of driving voltages.

The encapsulated liquid crystal structure may be induced to have a homeotropic transition temperature $T_H$ within the range of this invention by adding to it a homeotropic additive.

Exemplary results are provided in Table VIII, obtained with RY1011 liquid crystal and PVA containment medium, at a weight ratio of 83:17.

TABLE VIII

| Run | Additive | Amount (pph) | Homeotropic Transition Temp. (°C.) | $E_{max}$ | $E_{min}$ | $\dfrac{E_{max} - E_{min}}{E_{avg}}$ |
|---|---|---|---|---|---|---|
| 1 | None | 0 | n/a | 7.4 | 3.0 | 0.85 |
| 2 | Ia | 4.0 | <0 | 3.0 | 2.8 | 0.07 |
| 3 | Ia | 5.3 | 0 | 2.2 | 1.7 | 0.26 |
| 4 | Ia | 6.2 | 15 | 2.5 | 0 | 2.00 |

These additives are used in amounts of between 0.5 and 20 pph, preferably between 2 and 10 pph, per one hundred parts by weight of containment medium and liquid crystal composition. FIG. 8 illustrates the effect that may be obtained with homeotropic additives.

Alternatively, the homeotropic effect effect may be achieved by selecting the appropriate combination of containment medium and liquid crystal composition. An exemplary combination is Airflex ™ poly(ethylene-vinyl acetate) as the containment medium and E7 (Merck) as the liquid crystal composition.

EXAMPLE 14

This example illustrates the use of additives of our invention in the preparation of encapsulated liquid crystal structures made by a polymerization induced phase separation process. Liquid crystal (1.7 g, RY1007 containing 4.25 wt. % Surfynol ™ 104 additive was combined with an UV-curable optical adhesive (0.8 g, Norland ™ 65, from Norland Adhesives) in a vial. The vial was manually tumbled for a couple of minutes, after which the mixture was clear. Pre-laminated cells with a 7 μm spacer were filled with the mixture by capillary action, with the cells kept at 50° C. during the filling. Control cells which were identical but for the omission of the Surfynol ™ 104 were also prepared. The cells were cured for 299 sec with UV light of various intensities, using an ELC 600 unit from Electrolite Corporation). Cells cured with 10 mW/cm² intensity UV light were unsatisfactory, but those cured with higher intensity UV light (30–100 mW/cm²) were suitable for evaluation. Generally, a reduction of about one-third in the operating field $E_{90}$ was observed, compared to the control. The voltage holding ratio of the devices was generally around 85%. Results are detailed in Table IX:

TABLE IX

| Cure Conditions & Properties | Device with Surfynol ™ 104 | Control Device (no Surfynol ™ 104) |
|---|---|---|
| 30 mW/cm² | | |
| Operating field $E_{90}$ (v/μm) | 0.61 | 0.86 |
| Voltage holding ratio VHR (%) | 85 | 85 |
| Hysteresis | low | low |
| Contrast ratio | about 2.5:1 | 2.8:1 |
| 50 mW/cm² | | |
| Operating field $E_{90}$ (v/μm) | 0.61 | 0.90 |
| Voltage holding ratio VHR (%) | 85 | 85 |
| Hysteresis | low | low |
| Contrast ratio | about 2.5:1 | 2.8:1 |
| 100 mW/cm² | | |
| Operating field $E_{90}$ (v/μm) | 0.71 | 0.91 |
| Voltage holding ratio VHR (%) | 85 | 85 |
| Hysteresis | low | low |
| Contrast ratio | about 2.5:1 | 3.0:1 |

EXAMPLE 15

As stated above, we believe that the additive means improves performance at least in part by modifying the liquid crystal-containment medium interface. As is well known, wide angle X-ray diffraction can be used to measure molecular order in the Angstrom regime. The X-ray diffraction spectrum, which is a plot of the scattering intensity versus the angle of incidence $\theta$ of the X-ray beam relative to the sample, is determined by the Bragg equation:

$$n\lambda = 2d \sin \theta$$

where n is a positive integer, $\lambda$ is the wavelength of the X-ray radiation, d is the distance between scattering planes in the sample, and $\theta$ is as defined above. If a sample is highly ordered, as would be in the case of a macroscopic single crystal, a series of sharp peaks will be observed. Samples which are less well ordered (e.g., nematic liquid crystals) will show broader diffraction peaks. If the nematic director is substantially homogeneously aligned in a film comprising an encapsulated liquid structure, the spacings d relate to the direction which is orthogonal to both the nematic director and the plane of the structure. Because of the geometric placement of the source and detector relative to the sample in X-ray diffractometers, only those planes which are parallel to the surface of the film contribute to the diffraction at a particular angle. Therefore, if the liquid crystal scattering planes are substantially oriented parallel to the surface of the film, the intensity of the scattered X-rays will be larger than if the planes are angled with respect to the surface. The effect of the additive means on the orientation of the nematic director relative to the interface of the containment medium and the plane of the film may be monitored by X-ray diffraction.

FIG. 9a shows the wide angle X-ray scattering spectrum for a film comprising an encapsulated liquid crystal structure whose composition is 83:17 w:w liquid crystal (RY1014, Chisso) to PVA. Also shown is the diffraction spectrum for a reference film of PVA alone. Both films were coated onto ITO-sputtered glass and were analyzed open-faced in a wide-angle diffractometer (Siemens D-5000). The sharp peaks at 21, 30, and 35 degrees $2\theta$ arise from the ITO coating. From these data it is clear that the liquid crystal in the film dominates the X-ray scattering intensity between 14 and 30 degrees $2\theta$, the PVA not being sufficiently ordered or abundant to generate much scattering.

FIG. 9b shows the scattering for two films of encapsulated liquid crystal structure. Both films were made from liquid crystal RY1014 (Chisso) and PVA, in a ratio of 83:17 w:w and were 7.0 μm thick. They differed only in that one contained 4.25 parts per hundred additive Id and the other did not. There is a 40% reduction in the scattered intensity between 14 and 30 degrees $2\theta$ in the sample containing the additive. This reduction indicates a change in the director alignment relative to the film surface.

Accordingly, in another embodiment of the invention, the additive means not only reduces the operating field $E_{90}$ of a display by at least 10%, but also a film of the encapsulated liquid crystal structure has a wide-angle X-ray diffraction spectrum in which the scattering between 14 and 30 degrees $2\theta$ at least 20% less than that of an otherwise identical film of encapsulated liquid crystal structure in which the additive means is absent.

EXAMPLE 16

A mixture of dye-containing liquid crystal (2.2655 g, ZLI-3499, from Merck) and 3-methacryloxy propyl trimethoxy silane was added to a PVA solution and mixed to form an emulsion. The volume median of the emulsion was 2.11 μm. The emulsions were coated onto ITO/PET, and placed in an air-circulating oven at 80° C. After 2 hr the oven was switched off and allowed to cool to room temperature overnight. The sample was then laminated with a second piece of ITO/PET. The $V_{90}$ of the sample was about 20 V, whereas that of a control sample was 60–80 V. The value of $$\frac{(T_{on})^2}{T_{off} \cdot V_{90}}$$

was 33 for the sample.

EXAMPLE 17

This example illustrates the use of additives of this invention in the preparation of encapsulated liquid crystal structures by a polymerization-induced phase separation process. A solution of acrylate monomer (PN393, Merck) and liquid crystal (TL205, Merck) was prepared, at a weight ratio of 1:4. To this solution was added 3.9 w % compound Id (Air Products). This solution was introduced into a pre-spaced (10 μm) ITO coated glass cell. The sample was cured at 14 mW/cm² for 2 min. The operating field $E_{90}$ of the sample was 5.5 V/μm, compared to 7.6 V/μm for a control (no compound Id).

EXAMPLE 18

Several emulsions were made, where an organic acid was dissolved into the liquid crystal prior to forming an emulsion. The general procedure consisted of making a mixture of the liquid crystal (BL004, E. Merck, Darmstadt, Germany) and the organic acid, with the acid comprising 10% of the liquid crystal weight. The acids used were n-heptanoic acid, 2-propylpentanoic acid, and t-butyl acetic acid, each obtained from Aldrich Chemical. Each solution was made into an emulsion in aqueous PVA (Airvol ™ 205) with a liquid crystal to PVA ratio of 83:17, and a water content of 60%. A control emulsion (containing no acid) was also made. The mean volume diameter of each emulsion was measured with a CoulterCounter, and was within the range of 3.0±0.5 μm. Each emulsion was coated onto an ITO/PET substrate and allowed to dry for one hour. A second ITO/PET substrate was laminated over the top of this film to make a final device. The $E_{90}$ of each sample was measured using f/3.5 collection optics and 550 nm light, and is listed in the Table X following. It is seen that the measured $E_{90}$ of the acid containing samples is significantly lower than the control sample.

TABLE X

| Sample | Device Clearing Temperature (°C.) | Mean Volume Droplet Diameter (μm) | Actual Operating Field $E_{90}$ (V/μm) | Normalized Operating Field $E_{90}$ (V/μm) [a] |
| --- | --- | --- | --- | --- |
| Control | 88 | 3.2 | 4.4 | 4.7 |
| n-Heptanoic acid | 82 | 2.9 | 2.4 | 2.3 |
| 2-Propylpentanoic acid | 82 | 3.5 | 1.3 | 1.5 |
| t-Butyl acetic acid | 82 | 2.5 | 3.7 | 3.1 |

[a] Corrected for small differences in average droplet size between samples by normalizing to a mean volume diameter of 3.0 μm. The normalized $E_{90}$ was calculated by multiplying the measured $E_{90}$ a sample by 3.0 and dividing by the mean volume droplet diameter of that sample.

EXAMPLE 19

Dichroic dye (2.2% by weight, KKD-602, Showa) was dissolved into liquid crystal (RY1005, Chisso). Two emulsions A and B of the liquid crystal mixture were made in aqueous PVA (Airvol ™ 205) having median volume diameters of 3.8 μm and 2.1 μm, respectively (measured with a CoulterCounter), each emulsion having a liquid crystal:PVA ratio of 83:17 and a water content of 60%. Each emulsion was split into two volumes. To one volume of both emulsions "A" and "B" were added 2% (by liquid crystal weight) of the additive Ia. The emulsions were tumbled overnight. Each emulsion was coated onto an ITO/PET substrate and allowed to dry for one hour. A second ITO/PET substrate was laminated over the top of this film to make a final device. Each device had a dry film thickness of 15±1 μm.

FIG. 10 shows the transmission (at f/0) versus voltage curves for samples A and B, each with and without additive means Ia. Comparing the two emulsions containing no additive Ia, emulsion A requires a lower voltage to reorient the liquid crystal than emulsion B. This difference in operating voltage is well known in encapsulated liquid crystal systems, with devices possessing larger cavity sizes requiring lower operating voltages.

Comparison of the two samples containing 2% additive Ia, however, shows that both emulsions A and B possess approximately the same operating voltage. This means that the additive was much more effective in lowering the voltage in emulsion B (the small droplet emulsion) than it was in lowering the voltage in emulsion A (the large droplet emulsion). The fact that compound Ia has a stronger effect in the smaller droplet film is consistent with a weakening of the anchoring strength at the polymer wall.

Referring to Table XI, it shows $T_{50}$ values for the four emulsions compared above, $T_{50}$ having been defined hereinabove. It is clear that the voltage at $T_{50}$ is lowered more in emulsion B than in emulsion A at the 2% level of additive Ia.

TABLE XI

| Emulsion | Median Droplet Size (μm) | $T_{50}$ 0 w % Ia | $T_{50}$ 2 w % Ia | Ratio (2%:0%) |
| --- | --- | --- | --- | --- |
| A | 3.8 | 23 | 7 | 0.30 |

TABLE XI-continued

| Emulsion | Median Droplet Size (μm) | $T_{50}$ 0 w % Ia | $T_{50}$ 2 w % Ia | Ratio (2%:0%) |
|---|---|---|---|---|
| B | 2.1 | 36 | 8 | 0.22 |

Accordingly, in the embodiment of the invention the additive means causes a larger decrease in the operating field $E_{90}$ as the volume median cavity diameter is decreased.

What is claimed is:

1. A liquid crystal device having a reduced operating field $E_{90}$, comprising a first electrode;

a second electrode, at least one of the first and second electrodes being transparent; and an encapsulated liquid crystal structure between the electrodes, comprising (a) a containment medium; (b) a liquid crystal composition dispersed in the containment medium; and (c) additive means which is (I) a compound having a polar functionality selected from the group consisting of hydroxyl, carbonyl, carboxylic acid, ester, and nitro and further have at least one $C_5$–$C_{15}$ branched alkyl group having at least two methyl groups therein or (II) a reactive additive means selected from the group consisting of silane coupling agents having acrylic or methacrylic functionality, acrylic or methacrylic compounds, epoxy compounds, aldehydes, and thiol compounds and which reduces the operating field $E_{90}$ of the device by at least 10%; wherein at least one of the following conditions is fulfilled:

(i) liquid crystal composition is substantially free of dye and $$\frac{CR}{V_{90} \cdot (f/\#)^2} \geq 0.11$$

where CR is the contrast ratio of the liquid crystal device, $V_{90}$ is the operating voltage of the liquid crystal device, and f/# is the f/number of the measurement optics used to determine the contrast ratio, the optics operating at a wavelength between 400 and 700 nm and f/# having a value between 3.5 and 15;

(ii) the voltage holding ratio of the liquid crystal device is at least 50%;

(iii) the encapsulated liquid crystal structure further comprises a pleochroic dye dissolved in the liquid crystal material and the fraction $$\frac{(T_{on})^2}{T_{off} \cdot V_{90}}$$

is at least 10% greater than for an otherwise identical reference device in which the additive means is absent, wherein $T_{on}$ is the maximum transmission of the liquid crystal device in the presence of an applied sufficient voltage, $T_{off}$ is the transmission of the liquid crystal device in the absence of any applied voltage, and $V_{90}$ is the operating voltage of the liquid crystal device;

(iv) the liquid crystal device has a clearing point no more than 20° C. less than that of an otherwise identical reference liquid crystal device in which the additive means is absent;

(v) $\frac{E_{max} - E_{min}}{E_{avg}} < 0.30$ where $E_{avg}$, $E_{max}$, and $E_{min}$ are the average, maximum, and minimum values, respectively, of the operating field $E_{90}$ in the 10°–55° C. temperature range;

(vi) the contact angle between the liquid crystal composition and the containment medium is more than 5° greater than the contact angle between an otherwise identical liquid crystal composition and containment medium in which the additive means is absent;

(vii) the hysteresis of the liquid crystal device is at least 20% less than the hysteresis of an otherwise identical reference liquid crystal device in which the additive means is absent;

(viii) the additive means is a non-ionic surface active agent having sufficient activity to lower the surface tension of water by more than 10 dyne/cm when used in an amount of less than 2% w/w;

(ix) a film of the encapsulated liquid crystal structure has a wide-angle X-ray diffraction spectrum in which the scattering between 14 and 30 degrees $2\theta$ is at least 20% less than that of an otherwise identical film of encapsulated liquid crystal structure in which the additive means is absent; or (x) the additive means causes a larger decrease in the operating field $E_{90}$ as the volume median cavity diameter is decreased.

2. A liquid crystal device according to claim 1, wherein condition (i) is fulfilled.

3. A liquid crystal device according to claim 1, wherein condition (ii) is fulfilled.

4. A liquid crystal device according to claim 1, wherein condition (iii) is fulfilled.

5. A liquid crystal device according to claim 1, wherein condition (iv) is fulfilled.

6. A liquid crystal device according to claim 1, wherein condition (v) is fulfilled.

7. A liquid crystal device according to claim 1, wherein condition (vi) is fulfilled.

8. A liquid crystal device according to claim 1, wherein condition (vii) is fulfilled.

9. A liquid crystal device according to claim 1, wherein condition (viii) is fulfilled.

10. A liquid crystal device according to claim 1, wherein condition (ix) is fulfilled.

11. A liquid crystal device according to claim 1, wherein condition (x) is fulfilled.

12. A liquid crystal device according to claim 1, wherein the liquid crystal device has a rise time which is at least 10% faster than that of an otherwise identical reference liquid crystal device in which the additive means is absent.

13. A liquid crystal device according to claim 1, wherein the liquid crystal device has a fall time which is at least 10% faster than that of an otherwise identical reference liquid crystal device in which the additive means is absent.

14. A liquid crystal device according to claim 1, wherein the liquid crystal composition contains less than 1.8 meq/g cyano groups.

15. A liquid crystal device according to claim 1, wherein the liquid crystal composition has an average dielectric constant $\epsilon_{avg}$ greater than 5.

16. A liquid crystal device according to claim 1, wherein the liquid crystal composition has an optical anisotropy $\Delta n$ greater than 0.15.

17. A liquid crystal device according to claim 1, wherein the liquid crystal composition has a fluorine content greater than 2.0 meq/g.

18. A liquid crystal device according to claim 1, wherein the liquid crystal composition is operationally nematic and has a positive dielectric anisotropy.

19. A liquid crystal device comprising:
a first electrode;
a second electrode, at least one of the first and second electrodes being transparent; and
an encapsulated liquid crystal structure between the electrodes, comprising (a) a containment medium and (b) a liquid crystal composition dispersed in the containment medium, the encapsulated liquid crystal structure having a homeotropic transition temperature $T_H$ which is less than 5° C.

20. A liquid crystal device according to claim 2, wherein the liquid crystal composition is operationally nematic and has a positive dielectric anisotropy.

21. A liquid crystal device according to claim 3, wherein the liquid crystal composition is operationally nematic and has a positive dielectric anisotropy.

22. A liquid crystal device according to claim 4, wherein the liquid crystal composition is operationally nematic and has a positive dielectric anisotropy.

23. A liquid crystal device according to claim 5, wherein the liquid crystal composition is operationally nematic and has a positive dielectric anisotropy.

24. A liquid crystal device according to claim 6, wherein the liquid crystal composition is operationally nematic and has a positive dielectric anisotropy.

25. A liquid crystal device according to claim 7, wherein the liquid crystal composition is operationally nematic and has a positive dielectric anisotropy.

26. A liquid crystal device according to claim 8, wherein the liquid crystal composition is operationally nematic and has a positive dielectric anisotropy.

27. A liquid crystal device according to claim 9, wherein the liquid crystal composition is operationally nematic and has a positive dielectric anisotropy.

28. A liquid crystal device according to claim 10, wherein the liquid crystal composition is operationally nematic and has a positive dielectric anisotropy.

29. A liquid crystal device according to claim 11, wherein the liquid crystal composition is operationally nematic and has a positive dielectric anisotropy.

30. A liquid crystal device according to any of claims 20–29, wherein the additive means is a compound having a polar functionality selected from the group consisting of hydroxyl, carbonyl, carboxylic acid, ester, and nitro and further have at least one $C_5$–$C_{15}$ branched alkyl group having at least two methyl groups therein.

31. A liquid crystal device according to any of claims 20–29, wherein the additive means is a reactive additive means selected from the group consisting of silane coupling agents having acrylic or methacrylic functionality, acrylic or methacrylic compounds, epoxy compounds, aldehydes, and thiol compounds.

32. A liquid crystal device according to claim 31, wherein the additive means is an acrylic or methacrylic compound.

* * * * *

UNITED STATES PATENT AND TRADEMARK OFFICE
CERTIFICATE OF CORRECTION

PATENT NO. : 5,427,713
DATED : June 27, 1995
INVENTOR(S) : Mark F. Wartenberg, et al.

It is certified that error appears in the above-indentified patent and that said Letters Patent is hereby corrected as shown below:

Column 9, line 25 (Id), replace the first occurance of 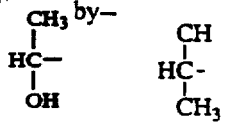 by— 

Signed and Sealed this

Twenty-third Day of January, 1996

Attest:

BRUCE LEHMAN

*Attesting Officer*     *Commissioner of Patents and Trademarks*